United States Patent [19]

David

[11] Patent Number: 4,739,668

[45] Date of Patent: Apr. 26, 1988

[54] INFINITELY VARIABLE (IV) POSITIVE DRIVE SYSTEM

[76] Inventor: Constant V. David, 4952 Field St., San Diego, Calif. 92110

[21] Appl. No.: 51,410

[22] Filed: May 19, 1987

[51] Int. Cl.$^4$ .......................... F16H 11/04; F16H 3/42
[52] U.S. Cl. ........................................ 74/63; 74/216.3
[58] Field of Search ............... 74/216.3, 63, 424.5, 74/424.7, 424.8 C, 793

[56] References Cited

U.S. PATENT DOCUMENTS

| Re. 26,476 | 10/1968 | Kuehnle | 74/63 |
| 2,082,433 | 6/1937 | Whitcomb | 74/216.3 |
| 2,764,030 | 9/1956 | Mackta | 74/216.3 |
| 3,807,243 | 4/1974 | Yada | 74/63 |

FOREIGN PATENT DOCUMENTS

| 0180153 | 10/1984 | Japan | 74/63 |
| 0892053 | 12/1981 | U.S.S.R. | 74/216.3 |

Primary Examiner—Leslie A. Braun
Assistant Examiner—Scott Anchell

[57] ABSTRACT

A power-transmitting and torque-converting positive drive system provides an infinitely variable (IV) ratio of angular speed adjustments between a power input shaft and a power output shaft. The power is transmitted by means of a continuous chain of balls pushing one another forward. These balls interact with the input shaft and the output shaft by means of the cooperation of two groups of balls simultaneously constrained between sets of associated short straight grooves and corresponding helical grooves. One group of balls is located between the input shaft and a sleeve, whereas the other group of balls is located between the output shaft and that sleeve. The balls are guided and restrained in a plurality of open-loop channels that enable each ball to progressively shift from one group to another, each ball acting as the individual tooth of a gear. These open loops are interconnected to form an endless closed loop housed in the sleeve structure nestled between the input shaft outer surface and the inner surface of a portion of the output shaft that surrounds a corresponding portion of the input shaft. Reverse speed and torque control features are provided. Slippage is altogether eliminated. Locking of the input shaft and/or the balls automatically locks the output shaft.

25 Claims, 3 Drawing Sheets

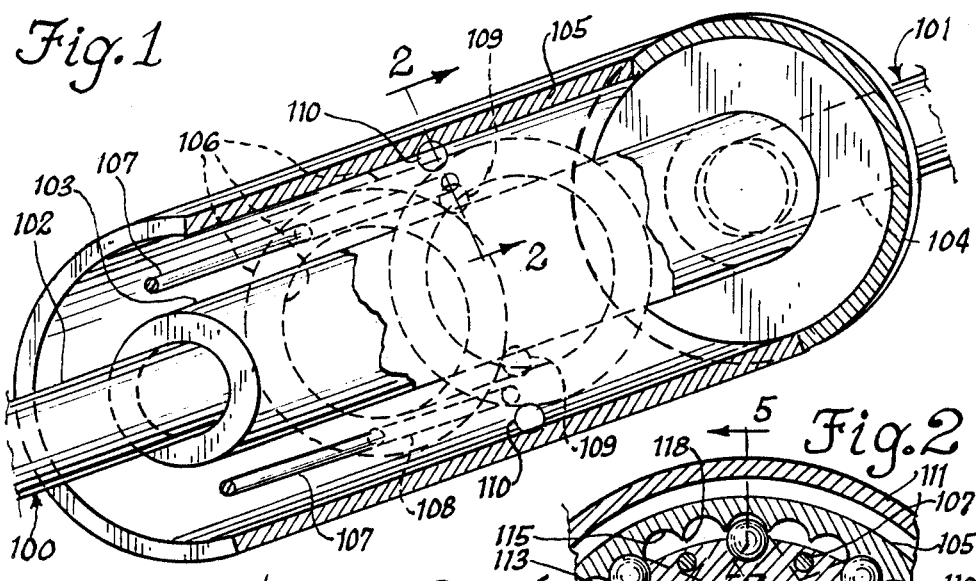
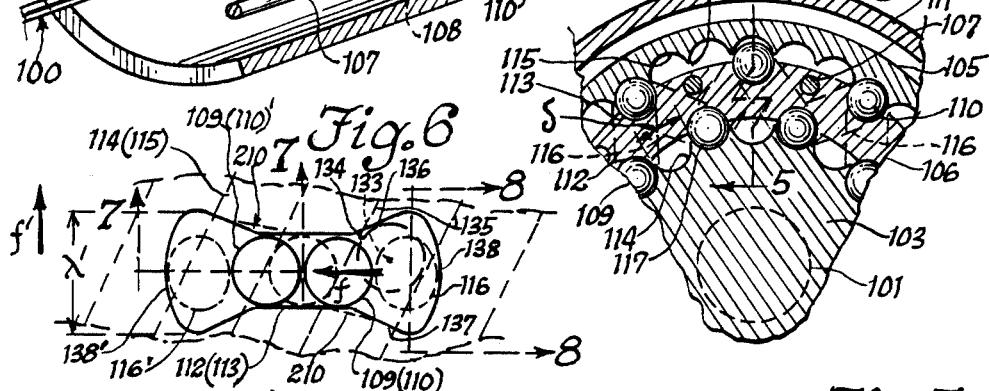
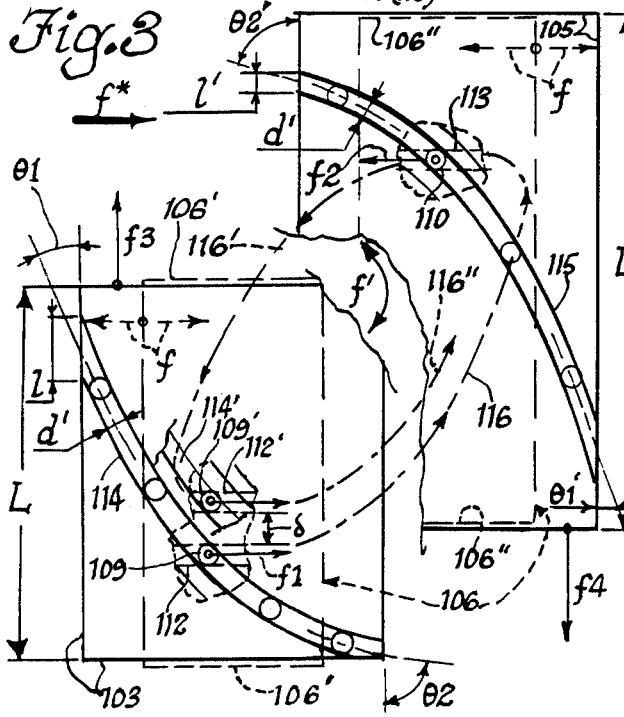
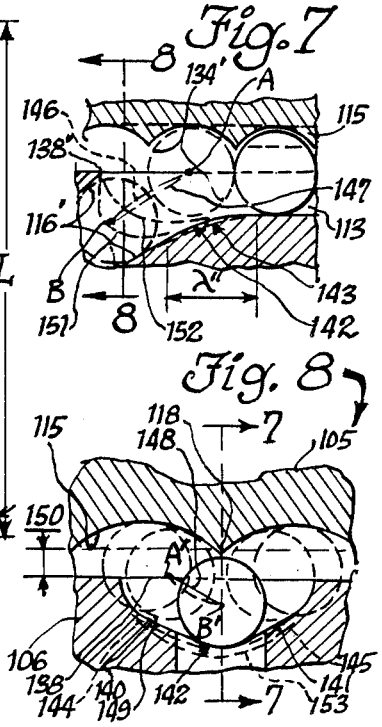

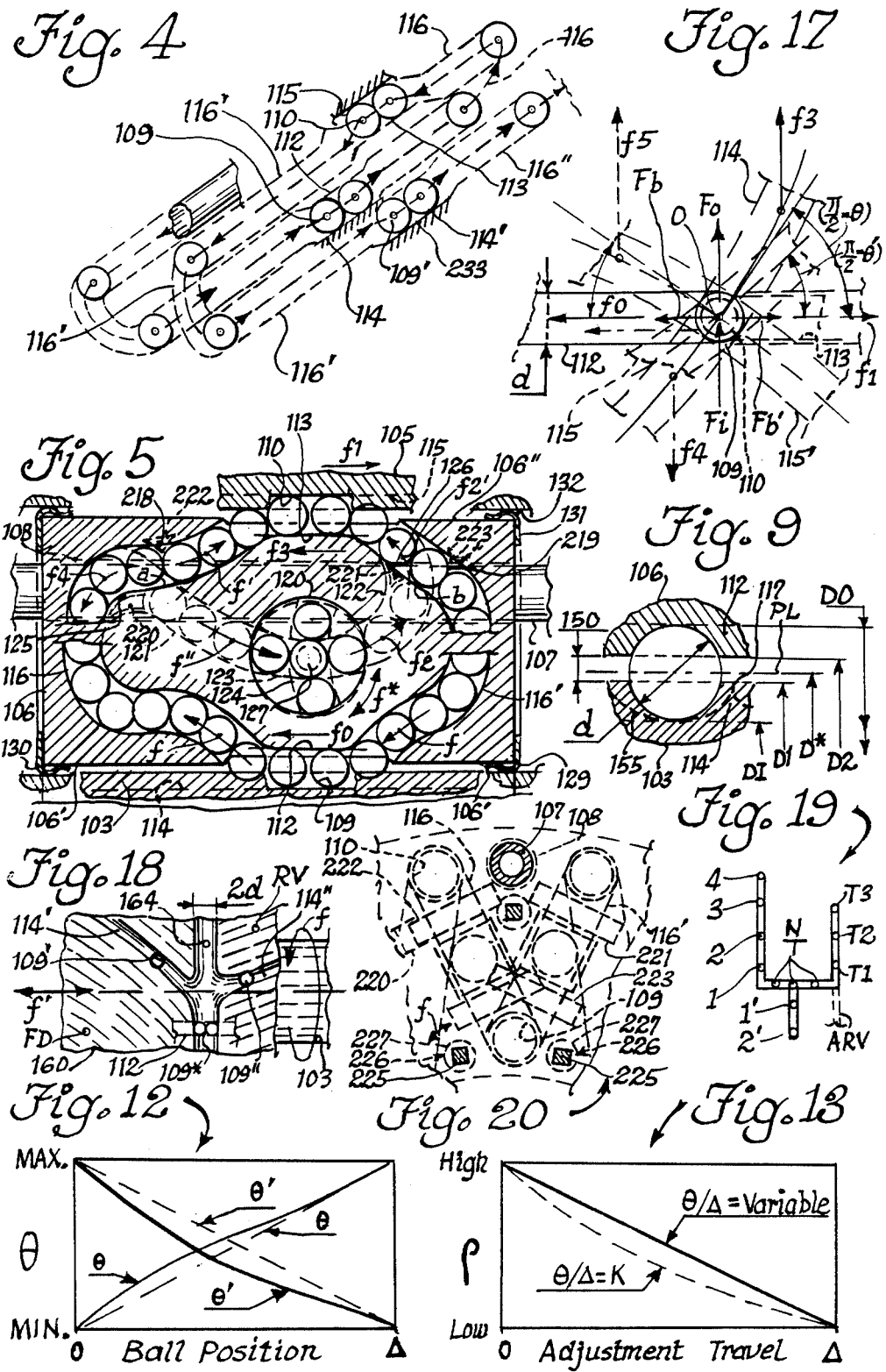

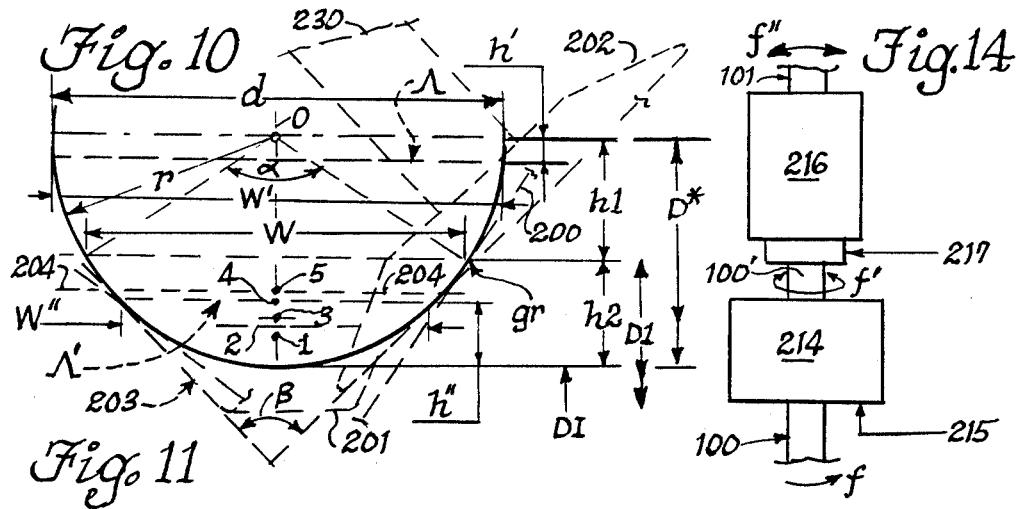
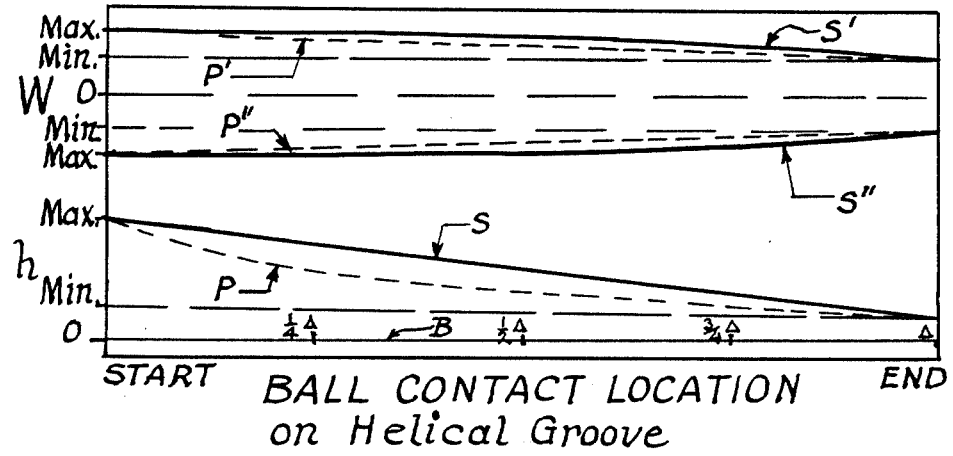
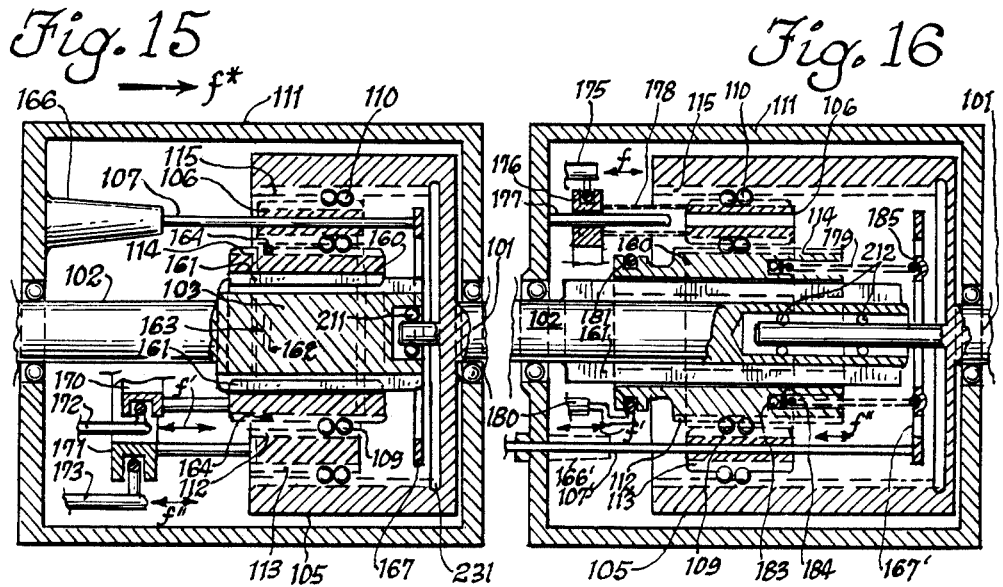

INFINITELY VARIABLE (IV) POSITIVE DRIVE SYSTEM

BACKGROUND OF THE INVENTION

The present invention relates to a system for transmitting power and converting torque mechanically so as to provide positive linkage between a power input shaft and a powered output shaft in ratios that can be infinitely varied, i.e. infinitely variable ratio or IV. The construction is an hybrid solution to the problem of enabling a gearbox to operate as a hydraulic torque converter, i.e. provide any input-to-output speed ratio between two limit values. The hydraulic analogy stems from the fact that the equivalent of a pump is provided and that the "fluid flow" of that pump drives the equivalent of a hydraulic motor. The "fluid" is replaced by mechanical links (balls) which can transmit pressure (push) but cannot exert suction (pull). Those mechanical links provide the positive mechanical connection between the shafts that eliminates the possibility of slippage and provides the additional possibility of positive locking.

Balls positioned between two surfaces enabled to slide relatively to each other have been used for transforming a sliding motion into a rotating motion (and vice versa) by means of cooperating grooves on both surfaces and arranged to constrain a ball. When properly guided and channelled, balls can provide the equivalent of a push rod that can follow and conform to a variety of curved shapes with a minimum of friction. The state-of-the-art of both technologies is old, extensively used in many applications and well known.

Efforts are continuously being made to develop variable speed ratio "gearboxes" that can provide progressively adjustable gear ratios for applications to transportation, i.e. cars, buses and/or trucks. The engine/vehicle coupling advantage offered by automatically adjustable gear ratios enables the engine to operate at its maximum efficiency regimes, be it from the fuel consumption or torque standpoints. This will result in appreciable fuel savings and improved vehicle performances.

In view of this background, the present invention provides those features, and combinations thereof, that are needed to substantially improve the efficiency and effectiveness of land vehicles, motorized or not. For the simplicity, the compactness and the light weight of its embodiments and constructions also make it very attractive for other transportation vehicles such as bicycles and motorcycles.

SUMMARY OF THE INVENTION

Accordingly, it is a primary object of the present invention to provide a new and improved system for transmitting power from a mechanical power source by means of an input shaft and output shaft to a vehicle in a manner such that the ratios of the torques and angular speeds of the two shafts can be adjusted continuously in a progressive fashion, i.e. infinitely variable ratio or IV ratio, for any level of the power so transmitted.

It is another object of the present invention to provide a system that regulates and controls the torque applied on the input shaft so as to enable the power source to operate at peak efficiency and effectiveness.

It is another object of the present invention to provide a system that enables an operator to reverse the angular direction of the output shaft rotation, whilst the input shaft rotation direction remains unchanged, so as to render this reverse speed ratio also infinitely variable.

It is another object of the present invention to provide a system that eliminates slippage and minimize friction during its power transmission and torque converting operations.

It is still another object of the present invention to provide a system that eliminates side loads between the shaft supports and the system support structure, thus providing a simple, compact and light weight construction.

DESCRIPTION OF THE DRAWINGS

FIG. 1 is a partly-open perspective schematic view of the system showing the basic components and their relative positions.

FIG. 2 is a partial transverse cross-section of the system taken along section line 2—2 of FIG. 1.

FIG. 3 is a schematic diagram depicting two sets of cooperating grooves and the paths of a ball therebetween.

FIG. 4 is a partial perspective view of two ball-channel loops showing their interconnection and the ball paths therein.

FIG. 5 is a partial longitudinal cross-section of the housing of the ball channels taken along section line 5—5 of FIG. 2.

FIG. 6 is a top planar view of two balls shown constrained in and by a straight groove of the sleeve.

FIG. 7 is a detail section schematic of an end of a sleeve straight groove of FIG. 5 taken along section line 7—7 of FIG. 8.

FIG. 8 is a detail section schematic of an end of a sleeve straight groove of FIG. 5 taken along section line 8—8 of FIG. 7.

FIG. 9 is a schematic cross-sectional view of a ball constrained by two cooperating grooves, straight and helical.

FIG. 10 is a diagrammatic view of a groove transversal section indicating typical dimensions and profile configurations.

FIG. 11 is a graphic representation of groove width and depth variations at various stations along a helical groove.

FIG. 12 is a graphic representation of a helical groove pitch angle variations as a function of the position of the engaged balls along such groove.

FIG. 13 is a graphic representation of the angular speed ratio variations as a function of engaged-ball positions along the helical grooves.

FIG. 14 is a schematic representation of a simpler embodiment of the present invention when coupled with a rotation direction inverting mechanism.

FIG. 15 is a longitudinal cross-sectional schematic of the subject system showing an integrated reverse speed construction.

FIG. 16 is a longitudinal cross-sectional schematic of the subject system showing an integrated torque control construction.

FIG. 17 is a diagram showing the forces and displacements imposed on cooperating straight and helical grooves by the ball that they constrain.

FIG. 18 is a partial planar view of the input shaft helical groove arrangement needed to provide reverse speed operation capability.

FIG. 19 is a schematic diagram illustrating the various relative positions assumed by a speed ratio shifting lever under driver's manual control.

FIG. 20 is a schematic drawing depicting diagrammatically an end view of the sleeve sectional portion presented in FIG. 5 when a ball-flow inverting valve is present for use in reverse-speed operation.

DETAILED DESCRIPTION OF THE INVENTION

Referring to FIG. 1, a partially-cut perspective view of my IV positive drive system shows the five basic components, or plurality thereof, which cooperate to provide the torque conversion and power transmission from power input shaft assembly 100 to power output shaft assembly 101. Input shaft assembly 100 consists of two main portions: drive axle 102 supported by a structure, bearings and seals (not shown, being well known in the art), and grooved axle 103. Output shaft assembly 101 consists of two main portions: torque axle 104 supported by the system structure and a bearing/seal combination (also not shown, being well known in the art), and grooved hollow axle portion 105 that surrounds the corresponding portion 103 of input shaft 100. A sleeve 106 (shown in dotted line for easy differentiation) slides freely between the outer grooved surface of axle 103 and the inner grooved surface of hollow portion 105. Sleeve 106 is prevented from rotating by means of guide rods such as 107 fixedly mounted on the system external structure. Guide rods 107 extend through sleeve 106 length longitudinally by means of guide holes 108. A plurality of balls such as 109 located between the input shaft and sleeve 106, and such as 110 located between sleeve 106 and the output shaft, are caused to engage cooperating grooves on corresponding facing surfaces of the sleeve and the shafts by sleeve 106.

The partial cross-section shown in FIG. 2 depicts how sleeve 106 causes balls 109 and 110 to positively engage sets of cooperating grooves. An external structure 111 envelopes and contains the internal working components above-described. The two concentric cylindrical surfaces of sleeve 106 are equipped with a plurality of short straight grooves such as 112 and 113 longitudinally oriented (parallel to the axis of rotation common to both shafts). The input shaft outer surface is covered with helically oriented grooves 114 and the output shaft inner surface is covered with helically oriented grooves 115. Balls 109 become lodged in the spaces formed by grooves 112 and 114 and balls 110 become lodged in the spaces formed by grooves 113 and 115. A plurality of channels such as 116 connecting straight grooves 112 and 113 enable balls 109 and 110 to continuously and simultaneously trade positions as is described in the diagram of FIG. 3 where the paths followed by the balls are illustrated.

FIG. 3 diagrammatically depicts the developed corresponding cylindrical surfaces of grooved axle 103, grooved axle 105 and sleeve 106. The thickness of sleeve 106, or the radial separation distance between the corresponding shaft outer and inner facing surfaces, is represented by a combination of longitudinal and lateral off-sets of surfaces 103, 105, 106' and 106", 106' and 106" representing respectively the inner and the outer concentric surfaces of sleeve 106. For reference purpose, the rotation axis of both shafts is represented by long—dash—line arrows f and the rotation direction is indicated by arrow f'. Sleeve 106 straight grooves 112 and 113 are parallel to arrow f and helical grooves 114 and 115 both form an angle with arrow f. As shown in FIG. 2, all helical grooves located on a cylindrical surface are adjoining and form a plurality of cusps such as 117 and 118, the crests or apices of these cusps cooperating to form the equivalent of the facing inner and outer surfaces of the two shafts. Whereas straight grooves 112 and 113 are separated by cylindrical lands of width $\delta$ for instance, in the case of grooves 112. When the engagement of ball 109, i.e. constrainment between grooves 112 and 114, is completed, ball 109 becomes entirely restrained by channel 116 shown in dash-dot line and is pushed in arrow f1 direction, as is described later, in the position of ball 110 between grooves 113 and 115. By means of the pushing action just mentioned, ball 110 constrained laterally by groove 113 is forced to move in arrow f2 direction which, in turn, forces surface 105 to move in arrow f4 direction so as to allow groove 115 to accommodate ball 110 longitudinal displacement in straight groove 113. Ball 110 then soon leaves straight groove 113 to enter channel 116' so as to return as ball 109' in straight groove 112' where it engages helical groove 114'. The rotation of surface 103 in arrow f3 direction eventually causes ball 109' to repeat a performance similar to that of ball 109, and ball 109' soon enters channel 116". The process is then repeated continuously around sleeve 106 and simultaneously by all balls being constrained in a set of straight and helical grooves at any given time. In FIG. 3, helical grooves 114 and 115 have the same helix pitch angle orientation, thus causing surfaces 103 and 105 (or shafts 100 and 101) to move in opposite direction, e.g. arrows f3 and f4.

The ball channelling and path constrainment shown in FIG. 3 are illustrated in perspective in FIG. 4 where the various grooves, balls and channels are identically called out for easy identification and reference. The sleeve straight grooves are depicted as slight "bumps" in the channel walls and the helical grooves are shown as small cross-hatched areas tangent to pairs of balls grouped together. Arrows located on the centerlines of the various channels indicate the manner in which all balls proceed along a path that forms a plurality of minor or elementary loops coiled circumferentially so as to form a single cylindrical main or major loop consisting of an assembly of all thus interconnected coils. The minor and major loops are housed in sleeve 106 body or structure, but for the short lengths of straight grooves 112 and 113 where the balls are caused to protrude externally to the sleeve body beyond the boundaries of the concentric surfaces.

As is explained and discussed in the next section, the pitch angle of the helical grooves must vary between the beginning and the end of these grooves so as to provide the means for varying and thus adjusting the shaft speed and torque ratios, or at least that of one of the two helical groove systems. The longitudinal distances separating the centerlines of two contiguous curved helical grooves then obviously must be allowed to vary in order to accommodate large variations of the pitch angles. It is also explained in the next section that the ball-constraining length of the straight grooves must be such that at least one ball, but no more than two, is always fully engaged in a set of grooves. For the present purpose, it is assumed that two balls in one straight groove can barely be fully engaged simultaneously. The maximum length of the straight portions of grooves 112 or 113 bottom and sides must thus remain slightly less than one ball diameter. For ease of representation, this dimension is shown as equal to or slightly in excess of a ball diameter in FIGS. 5 and 6. Whatever it is set to be in reality, it becomes apparent that if a ball enters the laterally-constraining portion of any straight groove exactly when a receiving helical groove is in perfect registration, it is unlikely and impractical to expect that a helical groove contiguous to the previously used helical groove will be in turn perfectly registering with the next ball that enters that subject straight groove. This could only be possible if the helix pitch angles remained constant along the helical grooves, which is of course unacceptable. Thus a physical and geometrical accommodation must be made at both ends of the straight grooves, as shown in FIGS. 6, 7 and 8. The sleeve cross-section illustrated in FIG. 5 may now be described.

First, it is obvious that FIG. 5 cross-section must correspond to a non-planar section of sleeve 106 in order to show almost continuous ball channels, as depicted by zigzaging section line 5—5 of FIG. 2. The corresponding section planes assembled in FIG. 5 are substantially orthogonal to FIG. 2 plane, though. The balls in the chain are all in direct contact with two contiguous balls and the total length of the major loop and of all straight grooves is substantially equal to N*d, if N* is the total number of balls contained in the chain just defined and d is the ball diameter. The discussion of the next section further defines this relationship. If the means for reversing the output shaft rotation direction are provided in the sleeve, additional balls are provided as indicated in FIG. 5 in phantom lines. Ball flow inverting valve 120 located between flow diverting channels 121 and 122, connected to forward speed channels 116 and 116' respectively, houses a short duct 123 which may assume position 124 when valve 120 is rotated about one quarter turn in the direction of arrow f*, counter-clockwise from position 123.

In the forward speed position 124 of valve 120, the balls are urged by the cooperative action of straight grooves 112 and helical grooves 114 to travel in arrow f0 direction and to follow a path defined by arrows f and f' so as to travel in arrow f1 direction in straight groove 113. When flow-inverting valve 120 is positioned to allow balls to flow in duct 123, balls travelling in arrow f direction are caused to enter channel 121 at location 125 and prevented from proceeding along arrow f' direction. The balls then travel through duct 123 and continue to proceed along arrow f2 direction. At location 126, the balls enter the upper branch of channel 116' so as to proceed in arrow f2' direction. Balls are then urged to travel along straight grooves 113 in arrow f3 direction where they interact with helical grooves 115 in a manner which causes output shaft portion 105 to rotate in a direction opposite to that of forward speed, i.e. reverse speed. A second flow-inverting valve similar to 120 (not shown) and operating in conjunction with valve 120 diverts the ball flow exiting straight groove 113 and following arrow f4 to enter the second flow-inverting valve by means of a flow-diverting channel operating like channel 121. A second flow-diverting channel similar to 122 connects this second flow-inverting valve to the lower branch of channel 116'. The balls then are enabled to enter another straight groove 112' adjacent to previous groove 112 so as to cause the balls to travel in arrow f0 direction which remains fixed, whether the output shaft rotates in either one of the two directions previously defined, i.e. forward and reverse. In such a construction, each minor loop is thus equipped with two ball-flow-inverting valves. They are caused to operate simultaneously by means of a common actuating mechanism that operates shaft 127 mounted on and centering each valve body.

A pair of flexible centering and guiding flanges 129 and 130 are attached to the annular end faces of sleeve 106. The inner and outer diameters of the flanges are dimensioned to fit loosely inside the inner cylindrical surface of output shaft 105 and outside the outer cylindrical surface of input shaft 103 so as to generate a minimum of friction therewith. Slots cut quasi radially between locations 131 and 132 all around the flange curved portions provide a degree of flexibility and springiness. The purpose of these two flanges is to prevent sleeve 106 from tilting and possibly making contact with either one of the two cylindrical surfaces just mentioned in response to accidental uneven solicitations of balls constrained in some of the straight grooves.

The top view of a straight groove (112 and/or 113) shown in FIG. 6 indicates how such solicitations may be created at random. Because this view applies equally to inner straight grooves and outer straight grooves, the reference numbers are indicated as a group of two numbers, e.g. 112(113) and 114(115). Assuming that the balls travel in the direction of arrow f, ball 109(110) emerges out of channel 116 in a position which may or may not be centered with one receiving helical groove 114(115), most likely it will not be and means must be provided for accommodating this likely eventuality, as previously described. On FIG. 6 right side, center 133 of emerging ball 134 must be allowed to position itself automatically and without mechanical interference on helical groove 135 centerline. If the sides of straight groove 112(113) continued in a parallel fashion to blend with the quasi elliptical contour of channel 116 cross-section, no such accommodation would be possible and binding would occur. However, when the two parallel sides of the groove diverge as shown by contour lines 136 and 137 to form a funnel-shaped entrance, ball 134 is enabled to move sideways slightly, thus enabled to engage helical groove 135 without creating binding. Helical groove 135 is then moving in arrow f' direction while ball 134 is being pushed by the following ball and is allowed to follow side 136 until it enters the straight portion of groove 112(113) when it becomes fully constrained laterally and is compelled to exert a side force in arrow f' direction on groove 135 wall.

Concurrently and simultaneously, other balls 134 are compelled to operate similarly in other constraining sets of corresponding straight grooves and cooperating helical grooves. Both the total number of balls in the chain and the number of straight grooves are such that the position of a fully engaged ball along the straight portion of a groove 112(113), for all the straight grooves and fully engaged balls, is different at any given time for each straight groove. This is discussed in the next section. Two consequences thereof should be mentioned here: (1) it is likely that the longitudinal or axial resulting component of the ball/helical-groove interacting forces will not always be centered on the common axis, and (2) it may be assumed with certainty that some balls will be simultaneously fully engaged but at different parts of their constrained travel along the straight portions of grooves 112(113). Consequence (1) indicates that sleeve tilting solicitations will be generated, hence the need for and use of guiding flanges 129 and 130. Consequence (2) demonstrates that the pushing action exerted by the input shaft on the chain of balls will be continuous and steadily applied, and that the torque transmitted to the output shaft will also be continuous and without significant variations about a mean value. The action of the balls may be compared to that of the conjugate synchronized action of the teeth of meshing gears, two engaged balls at channel 116 ends being the equivalent of two engaged tooth.

The partial sections of the ends of a straight groove illustrated in FIGS. 7 and 8 show how the bottom and side surfaces of these funnel-shaped ends must be contoured so as to complete the ball unhindered travel and instantaneous lodging accommodations during the transitory period between ball emergence and full engagement. It is assumed for ease of understanding and to satisfy the requirements of speed reversing by means of ball motion inversion in grooves 113 that both ends of all straight grooves are identical. For this reason, the leaving of a straight groove by a ball can be assumed to be the reverse of the process described for the entering of a straight groove by ball 134. In that instance, lips 138' play a facilitating role in the ball urging action that results in ball 134' entrance in channel 116'. It should be remembered that the surfaces of the helical grooves are not expected to and cannot provide any assistance here for obvious reasons. Accommodations must be provided elsewhere for their randomly occurring presence. In FIGS. 7 and 8, the shapes of side walls 140 and 141 and of bottom wall 142 are such that ball 134' can be satisfactorily both restrained and guided within limits which insure that: (1) ball 134' (or ball 134) will not cause binding until it fully enters channel 116' (or fully enters the straight portion of groove 113), and (2) ball 134' and/or ball 134 will not depart appreciably from the nominal path which they are supposed to follow, so that neither ball binding can occur nor the ball chain total length can vary appreciably.

This is discussed in the following section, but the means for insuring against such events are described here. Two constructive facts are helpful for both understanding why the proposed solution will work and evaluating its negligible effects on performance. Firstly, lubrication of the balls along the totality of their paths is assured by maintaining a level of lubricating oil inside structure 111 such that a lower segment of sleeve 106 is bathed in oil, at rest. Secondly, the diameter of a ball channel could easily exceed 10-15% of the ball diameter d before: (1) a noticeable variation of the channel length occupied by two contiguous balls so off-set occurs, and (2) any noticeable amount of laterally-applied side load exerted by the off-set ball on the channel wall can develop. This translates in FIGS. 7 and 8 by being permitted to enlarge the passage offered to the balls during the transitory travel of their centers from point A to point B in FIG. 7 and from point A' to point B' in FIG. 8, from a minimum-size passage way illustrated by curves 140 and 142 to a maximum-size-passage way illustrated by curves 143, 144 and 145 shown in dotted lines. A corresponding adjustment can be shown in the locus of the ball centers. Curves 146 and 148 correspond to the minimum-size-passage way and curves 147 and 149 correspond to the maximum-size-passage way. It should be noted that these curves in FIG. 7 are unrelated to those curves in FIG. 8, being located in two orthogonal planes. Such a lengthy description of this design detail is deemed justified here because it is a crucial element of the system.

The above description applies to the case where gap 150 between the surface of the sleeve and of the associated facing grooved surface is fixed. As is discussed in the next section, that gap may also vary from one end of the helical grooves to another. This variation may also be accommodated by laterally enlarging the space offered to the balls before they enter channel 116. A typical amount of such enlargement is depicted by curves 151 (minimum passage way) and 152 (maximum passage way) in FIG. 7. Such enlargement translates in FIG. 8 by lowering curves 144 and 145 to curve 153 level.

The surface enveloping those surfaces which correspond to the worst combinations of curve 143, 144, 145 and 153 cases for any and all sleeve 106 positions between the two end planes of the helical grooves represents profile sections of the the topographical contour of the end portions of straight grooves. While travelling through these end portions, the balls do not and are not expected to transmit any torque from one shaft to the other. They only transmit the pushing full thrusts that are imparted to them by the interaction of the input shaft with the sleeve inner straight grooves, in the case of balls about to enter the sleeve outer straight grooves. Balls about to enter the sleeve inner straight grooves are pushed by a residual thrust generated by balls exiting the sleeve outer straight grooves, i.e. the equivalent of a back pressure. Balls will be prevented from jamming and/or creating a binding condition by limiting the width $\lambda'$ and the length $\lambda''$ of the end portions (FIGS. 6 and 7), which are dictated by the range of the variations in pitch angle of the helical grooves, as discussed in the next section.

The ball/groove schematic of FIG. 9 indicates typical dimensions of either groove set, i.e. input-shaft/sleeve or sleeve/output-shaft. It is assumed that an input-shaft/sleeve groove set is shown in FIG. 9. Corresponding dimensions of a sleeve/output-shaft set are later differentiated by a ' sign. D* is the pitch diameter and assumed to be the same for both cooperating straight and helical grooves of a set and remains constant. DI and DO are the groove bottom diameters and also remain constant. D* is equal to (DI+DO)/2 and represents the diameter of the cylindrical surface on which fully-engaged ball centrs are and always remain theoretically located. Gap 150 varies for reasons discussed in the next section and is equal to (D2−D1)/2 where D1 is the diameter of the input shaft "cylindrical surface" or locus surface of apices 117, thus variable, and D2 is the diameter of the inner cylindrical surface of the sleeve (lands of width $\delta$) which is fixed. The ball diameter is d, d/2 being the radius of the groove cross-sections. Helical grooves would in reality appear as contour 155 shown in dotted line, in FIG. 9 section.

FIGS. 10, 11, 12 and 13 graphically describe geometrical aspects of the ball/groove arrangements that influence the performance and capability of the present invention system. These are discussed in the next section. FIG. 14 schematically represents a manner by which the present invention system is enabled to keep its simplest form and be adapted to motorized land vehicles by means of a conventional rotational speed inverter. This is also discussed in the next section.

FIGS. 15 and 16 schematically describe the system of the present invention in the context of its practical application to the propulsion of motorized land vehicles such as cars, buses and/or trucks, and for which reverse speed capability is essential. The basic components and elements previously identified have retained the same reference numbers and are easily recognizable. In FIG. 15, the reverse speed capability is provided by enabling balls 109 in the sleeve inner straight grooves 112 to engage helical grooves 114 designed to cause a reversal of their pitch angle. In FIG. 16, a reverse speed capability may be provided but is not shown. Provisions for another capability are indicated, that of input-shaft torque control. In both constructions, a slideable annular member 160 is inserted between input shaft 102 portion 103 and sleeve 106, member 160 and shaft 102 thus forming input shaft assembly 100 of FIG. 1. Member 160 and portion 103 of the input shaft are both equipped with longitudinal splines 161 that enable member 160 to slide axially on shaft portion 103, while concurrently preventing their relative rotation.

In FIG. 15 embodiment, the helically-grooved outer cylindrical surface of member 160 is covered by two distinct groups or types of helical grooves, differing in the orientation of their helix pitch in the manner previously mentioned. These two groups are separated by a groove 164 outlined by dotted lines 162 and 163, as further illustrated in FIG. 18 schematic detail drawing. In this partial external view of groove 164 and of the two helical groove groups, individual groove outlines are depicted so as to show this change of pitch angle orientation. Ball 109' is indicated as engaging helical groove 114' representative of group FD (forward speed). Ball 109" is shown engaging helical groove 114" representative of group RV (reverse speed). Separation groove 164 between the two groups is oriented perpendicularly to member 160 axis of rotation (arrow f') and is at least as wide as 2d and as deep as grooves 114' and 114". Referring to FIG. 5 above FIG. 18, one can see why sleeve 106 is then enabled to free-wheel about member 160 when two balls 109* are caused to become positioned in groove 164 that extends the length of member 160 circumference. Member 160, enabled to slide on shaft portion 103, may thus position groove 164 in neutral, forward or reverse position for a set reference axial position of sleeve 106 or balls 109*. The positioning means for both member 160 and sleeve 106 are illustrated in FIG. 15.

These positioning means consist of circular grooved rings 170 and 171 actuated respectively by command rods 172 and 173 that engage the rings by means of fingers sliding in the ring grooves in a manner well known in the art. Rings 170 and 171 are connected to member 160 and sleeve 106, respectively. The coordinating details of the motions along arrows f' and f" of the two command rods 172 and 173 are located externally to structure 111 and are not shown, being also well known in the art. Suffices it to state that command rod 172 must be locked in one of three fixed positions, one for FORWARD, one for NEUTRAL and one for REVERSE. Command rod 173 is enabled to assume corresponding positions over ranges thereof for each one of the fixed positions of command rod 172 as follows: (1) a large range of positions for the FORWARD setting, (2) one position for the NEUTRAL setting, and (3) a short range of positions for the REVERSE setting. The range of positions in the reverse setting may be made much larger for certain types of vehicles such as tractors and tanks for instance. The pitch angle of group RV helical grooves may be fixed or variable so as to augment both the number and range of reverse speed capabilities. It is worth mentioning that member 160 could be mounted on output shaft portion 105 inner surface in a manner similar to that which is described above, in an alternate embodiment. Guiding rods 107 must resist any residual torque exerted on sleeve 106. To that effect they are rigidly affixed to structure 111 by a rigid mount 166. Lateral bending of rods 107 can be further curtailed by reinforcing ring structure 167 that rigidly connect all of the ends of guiding rods 107.

In FIG. 16, two approaches to the automatic or self-regulating control of the torque developed by input shaft assembly 100 are illustrated. In a preferred embodiment, sleeve 106 axial position is not directly set by a drive system operator, but is made self-adjusting by being enabled to balance axial loads imposed on it by the torque transmission and conversion process against an adjustable force applied by an adjustable spring system. In an alternate embodiment illustrated in phantom lines, sliding member 160 axial position is not directly set by a drive system operator but is made self-adjusting by means of the balancing action of the axial component of the input shaft transmitted torque and of an adjustable spring load opposing member 160 axial displacements caused by such axial torque component. In both constructions, the element not restrained by a spring action, sleeve or member, may be positively and directly positioned by an operator, manually or by a control system regulating and/or monitoring the vehicle operation.

The preferred torque control embodiment is described first. It includes an externally actuated command rod 175 engaging ring 176 guided by and sliding in arrow f direction on stems 177 mounted on structure 111 and enabled to adjustably compress a plurality of springs 178 against sleeve 106. Member 160 axial position can be adjusted by means of externally actuated command rod 180 connected to a ring lodged in circular groove 181 cut in member 160 body. Each command rod 180 axial position thus fixes a corresponding position of helical grooves 114 in arrow f' direction along which sleeve 106 straight grooves are then enabled to position themselves freely so as to allow the axial loads applied on sleeve 106 to balance out. Rods 107' prevent sleeve 106 rotation.

The alternate torque control embodiment reverses the roles previously played by sleeve 106 and member 160. The axial position of sleeve 106 is adjusted as was earlier described in the case of FIG. 15, thus command rod 173 and grooved ring 171 need not be shown in FIG. 16 but could be located where the assembly of command rod 175 to springs 178 is depicted. However, the means for enabling member 160 to freely adjust its axial position on splines 161 are shown in phantom lines. These means must provide free access to one end of member 160 by a spring. For ease of illustration, because of the presence of the previously described command systems (rods 175 and 180), the back end face of member 160 is used for the description of the following alternate embodiment, although member 160 front end could just as well be used in reality, since command rod 180 and groove 181 are not needed in this latter instance.

This alternate embodiment thus requires two modifications in the drawing, though not needed in reality. The examplary construction depicted includes: (1) the use of sleeve guiding rods 107' for access to the back end of member 160, (2) the use of mount 166' for enabling rods 107' to slide in arrow f" direction and become axially adjustable, and (3) the use of reinforcing ring structure 167' for permitting the adjustment of spring 179. In this instance, member 160 rotates and ring 167' does not. Therefore, a ball thrust bearing 183 is located at the bottom of annular groove 184 so as to enable spring 179 to remain fixed and to have its other end simply retained by a recessed groove 185 formed in an innerly located flange extending inward from ring 167' structure. One can easily see how each axial position of rods 107' corresponds to a set position of spring 179 adjustable end, hence imposes a set amount of compression on spring 179 so as to provide a variation range for the axial component of the torque exerted by member 160 on the balls engaging its helical grooves.

The forces resulting from the interactions of the input shaft helical grooves with the fully engaged balls, of these balls with the sleeve inner straight grooves, of the balls being pushed by these latter balls on the channel curves inside the sleeve, of the balls in the outer straight grooves on the sleeve and of these balls on the output shaft helical grooves may be all assumed to be physically concentrated in one common point 0 of FIG. 17, for analytical purpose. Furthermore, the complex plurality of balls and grooves may be reduced to a simpler combination of two balls and four grooves: (1) one ball constrained by a set of inner grooves, one straight and one helical, for inputing the torque into the converter, and (2) another ball constrained by a set of outer grooves, one straight and one helical, for imparting the output torque to a power output shaft. In such a simplified system, friction losses are ignored and the reactions between a ball and its constraining surfaces can be assumed to be perpendicular to these surfaces and contained in the tangency plane common to the cylindrical surfaces previously defined. For the sake of simplicity and for the purpose of the disclosure, referring back to FIG. 9 diagram, this common tangency plane passes through pitch line PL, is perpendicular to the plane of FIG. 9 and is tangent to a cylindrical surface of diameter D*. The groove width is assumed to be equal to the ball diameter d. Both constrained balls are assumed to have a common center, point 0, but for ease of illustration, one ball shown in dotted lines has a slightly smaller diameter and its constraining grooves are shown having a slightly smaller width, and also shown in dotted lines. The ball/groove system for inputing the torque is shown in solid lines and represented being located above the ball/groove system of the output shaft. The helical grooves have the same pitch angle orientation, which means that the two shafts rotate in opposite directions (FIG. 3 representation case). With those simplifications and conventions, the diagram of FIG. 17 may be used to describe realistically the various interactions mentioned above. The ball/groove reactions resisted statically by bearings and walls, thus dissipating very little energy and causing very little loss of torque, are ignored. Only forces in line with corresponding motion directions are considered in the following description, being the only ones of importance here.

In summary, at point 0, helical groove 114 exerts a force Fi on ball 109 that provides a useful force Fb which urges ball 109 to move in direction f0. Assuming no loss in channel 116, force Fb appears as an equal force Fb' of opposite direction f1 exerted on the left side of helical groove 115, which results in force Fo being applied downwardly at point 0 tangentially to the inner cylindrical surface of the output shaft portion 105. Force Fo creates the output torque imparted to the power output shaft. According to the convention stated earlier, the axially directed force components exerted on helical groove sides are transmitted by the shafts to their bearings and then to structure 111. These axial components neither dissipate nor transmit power and can be ignored, for the time being. However, forces Fi and Fo represent under steady-state operating conditions the torque components of interest, input and output respectively. This is further discussed in the next section. Force Fo causes the output shaft helical grooves to move in arrow f4 direction.

A similar description applies to helical groove 115' having an orientation opposed to that of helical groove 115, under similar circumstances. Force Fb' then generates a component Fo' of direction opposite to that of Fo and groove 115' moves in arrow f5 direction, both input and output shafts thus rotating in the same direction. If the direction of Fb' is reversed, i.e. by means of ball-flow-inverting valve 120, the direction of arrow f4 is also reversed (reverse-speed case). If helical groove 114 orientation direction is inverted, e.g. by means of a shift from group FD to group RV of the helical grooves, in FIG. 18, the direction of arrow f4 is then also reversed (reverse-speed case).

The schematic diagram of FIG. 19 illustrates the manner in which various positions of the speed ratio shifting lever could be arranged for automobile applications. These positions for FD and RV drivings correspond to a vehicle operation for which the driver can manually select speed ratios and associated engine operating torque levels. The use of the various embodiments and constructions of the present invention as applied to cars, buses and trucks is further described and discussed in the following section.

The schematic drawing of FIG. 20 depicts diagrammatically an end view of sleeve 106 portion in which shaped pins are used for altering the channelling of the balls in channels 116 and 116' of FIG. 5, when ball-flow-inverting valve 120 is incorporated in sleeve 106. The positioning and actuation of these pins for detouring the ball paths are further described in the next section. The rationale for and the justification of their presence, their locations and their use is also discussed at length in that section. They operate simultaneously with valve 120.

OPERATION AND DISCUSSION

As mentioned in the preceding section, the infinitely variable (IV) feature of speed ratio adjustment that the present invention system provides mandates that the pitch angle of the helical grooves of at least one shaft cylindrical facing surface vary lengthwise along the groove. Such requirement imposes many restrictions, limitations and constraints on the nature and extent of flexibility available to the designer of such a system. For reasons that will become clear later and to limit the system complexity, because two concentric arrangements of helical grooves are always needed, it is arbitrarily assumed that the pitch angle of both groups of helical grooves will vary and that the effects of such variations compound. Such a ground rule happens to be compatible with the overall range of speed ratios that are required for most land vehicles, from bicycles to automobiles. The following discussion is thus limited to cases in which the pitch angles of all helical grooves vary concomitantly but in an opposite manner. Governing relationships between various system operational and design parameters need be established first.

System Operation Analysis

Operational parameters are those of a general nature which characterize the system regardless of its internal design and/or of the dimensions and exact configurations of its components. Design parameters pertain to and define internal component configurations and dimension ratios. For instance, the most typical operational parameters are:

the power input shaft angular velocity or speed $\omega$, the power output shaft angular velocity or speed $\omega'$,
the power input shaft applied torque Q,
the power output shaft transmitted torque Q',
the sum total of the tangential forces applied on the balls Fi by the input shaft helical grooves, and
the sum total of the tangential forces exerted by the balls Fo on the output shaft helical grooves.

Most typical design parameters are listed below:
the number of helical grooves present on the input shaft outer cylindrical facing surface n,
the number of helical grooves present on the output shaft inner cylindrical facing surface m,
the helix pitch angle $\theta$ range and limits ($\theta 1$ and $\theta 2$) of the input shaft helical grooves,
the helix pitch angle $\theta'$ range and limits ($\theta 1'$ and $\theta 2'$) of the output shaft helical groves,
the number of short straight grooves provided on each concentric cylindrical surface of the sleeve p,
the total number N* of balls of diameter d that are contained in one moving ball chain,
the pitch diameter D* of the balls fully engaged between the sleeve straight grooves and the input shaft helical grooves, and
the pitch diameter D*' of the balls fully engaged between the sleeve straight grooves and the output shaft helical grooves.

An examination of FIG. 2 partial cross-section of the drive system indicates that a large number of the above-listed design parameters are related and their values cannot be selected arbitrarily. Several conditions must be concurrently satisfied to enable the system to function. A first condition is that no area of the "imaginary" facing cylindrical surfaces of portions 103 and 105 of the respective input and output shafts must be present, which might cause ball jamming or binding. A second condition dictates that the numbers of straight grooves on the inner and outer surfaces of the sleeve must be equal. A third condition of a practical nature requires that all helical grooves should be equally used so as to even out the results of groove surface wear. Fourthly, the radial distance between the two ball-pitch diameters is directly related to the ball diameter d and the presence, or lack thereof, of ball-flow-inverting valves. Finally, it is imperative that at least three quasi angularly equally-spaced balls be continuously fully engaged so as to insure a self-centering action between shaft portions 103 and 105. In order to facilitate the determination of critical design parameter optimum values, relationships between themselves and with the operational parameters must first be established.

From the description given in FIG. 17 of the idealized interactions that take place between balls 109 and 110 and their constraining cooperating grooves, one can easily derive the following set of equations: $Fi = Fb.\tan \theta$, $Fo = Fb'.\tan \theta'$, $V = \omega.R.\tan \theta$, $V' = \omega'.R'.\tan \theta'$, $Q = Fi.R$ and $Q' = Fo.R'$ where V and V' are the velocities of balls 109 and 110 respectively, and R and R' are equal to $D*/2$ and $D*'/2$ respectively. Substituting and rearranging terms in these equations yield two basic equations by writing that Fi and Fo, V and V' must have equal absolute values:

$\omega'/\omega = (R/R').(\tan \theta / \tan \theta')$ (1) →speed ratio equation, $Q'/Q = (R'/R).(\tan \theta' / \tan \theta)$ (2) →torque ratio equation.

The torque ratio is of course the inverse of the speed ratio. As pitch angle $\theta$ of a helical groove increases, its width must decrease concomitantly to accommodate the fact that the diameters of the cylindrical surfaces onto which the helical grooves all bottom out are constant and the condition that the imaginary helically-grooved cylindrical surfaces be comprised only of helical groove ridges (crests or apices). Referring to FIG. 3, this means that the portion occupied by a groove of the circumference of a grooved surface section taken orthogonally to the shaft common axis of rotation must vary with $\theta$. If d' is the variable width of a typical helical groove and 1 (or 1') is that circumference portion, 1 or 1' must remain constant and d' must vary accordingly and be equal. FIG. 3 is only a schematic and obviously 1 and 1' are not shown as being equal, but should be in reality. Thus $1 = 1' = d'.\sin \theta$ at all times, at all locations and for both helical groove groups. 1 and 1' are determined by the numbers n and m of helical grooves on each surface and the average value of d' should approximately be the same for all helical grooves of both groups. In a general way, $d' = \pi D1/n.\sin \theta = \pi D1'/m.\sin \theta$. Practically, $\theta$ cannot vary between 0 and $\pi/2$ obviously but between narrower limits, d' cannot vary over the whole range 0-d for obvious reasons, the values of n and m must be compatible with the value of p, and accommodating small variations of D1 and D1' values lengthwise along a helical groove are acceptable since they only correspond to imaginary surfaces. Henceforth, D1 and D1' are considered constant for practical purposes. D1/n and D1'/m have basically the same mean value. Thus, d' must vary as the inverse of $\sin \theta$. Practical values of n, m and p must first be sought.

Obviously the presence of contiguous balls cannot be accommodated in two adjacent helical grooves, as they might physically interfere. Thus n must be equal to at least 2p. m must be larger than n obviously and be a multiple of p. p should preferably be a multiple of 3 (three-contact-point condition). For practical reasons, diameter d should be as large as possible whilst D* should be as small as possible to minimize the drive system outer diameter. On the other hand, smaller values of d and larger values of N* will yield smaller amplitudes of the variations of the torque or of the angular speed of the output shaft, though of a higher frequency, which may be desirable. For these reasons p should be larger than 3, possibly 6 and preferably 9 or more. $p = 6$ might be aceptable for bicycles, whereas $p = 9$ might represent a minimum for a car. The configuration of FIG. 2 corresponds to $p = 12$. Then $n = 2p = 24$ in this case. m is shown as being equal to 3p or 3n/2 which yields a value of 1.5 for $D*'/D*$. This represents the lowest practical value of $(D*' - D*)/2$ that can be realistically used if ball-flow-inverting valves are not located in the sleeve body. Additional helical grooves 115 can be inserted between the sleeve outer straight grooves, i.e. m could be equal to kp where k is 4, 5, 6, etc.... Another approach is to increase n slightly and to decrease p, e.g. $p = 9$ and $n = 27$ (three helical grooves 114 to each sleeve inner straight groove 112). m can be either $4p = 36$, $5p = 45$, etc.... The corresponding ratios m/n or $D*'/D*$ are then 1.333, 1.667, etc.... The ratio 1.667 is larger than 1.5 and corresponds to more radial space being then made available within the sleeve body. The above examples are given to show that considerable flexibility is provided for space creation in the sleeve, without appreciably affecting the system performance.

The capacity of the drive system, i.e. maximum power rating, can be adjusted by varying the sizes of the balls and groove sections. The dimensionless parameter d/D* (or d/D*') retains approximately the same value in all cases within the range of variations of n, m and p mentioned above. Attempting to determine an optimum value for ratio d/D* is beyond the scope of this disclosure. However, critical load factors used in ball bearing technology at the ball-race contact points could be considered as a guide by designers of the present drive system in the case of specific applications. For the purpose of this disclosure, it is believed that the dimensional proportions indicated in FIG. 2 for balls, grooves and pitch diameters are fairly representative of a quasi optimized drive system configuration.

The operational performance and design limitations imposed by the mandatory variations of $\theta$ and $\theta'$ along helical grooves between the ends of portions 103 and 105 of the two shafts can now be discussed. The schematic diagrams of FIGS. 3 and 10 are used to that effect. FIG. 10 shows a typical section of a groove by a plane perpendicular to the groove centerline (point 0). Typical dimensions of interest here are:

---
r - ball diameter (d/2)    W - groove width at diameter D1
h1 and h2 - define the position of the surface of diameter D1
W' - maximum groove width at a minimum possible value h' of h1
W'' - minimum groove width at a maximum possible value h''
of h2
$\alpha$ - angular "width" of the groove    h2 - groove depth
---

Obviously, $h1+h2=r$, $h1=(D^*-D1)/2$ and $h2=(D1-DI)/2$. Readers are reminded that h' and W' do not vary and are fixed in the case of straight grooves. Also, W' and h' correspond to the maximum values reached by $\theta$ and $\theta'$, i.e. $\theta 1$ and $\theta 1'$, whereas W'' and h'' correspond to the minimum values reached by $\theta$ and $\theta'$, i.e. $\theta 2$ and $\theta 2''$ of FIG. 3.

The balls and grooves of the present drive system operate like the balls and tracks of a deep groove ball bearing designed to transmit axially directed thrusts. The depth of the groove is of prime consideration here. A side load exerted by the ball on the groove wall will cause a minimum of contact pressure, hence of compressive stress, when the load is applied as close as possible to a direction parallel to horizontal line $\Lambda$. Any deviation therefrom will create an amplifying wedge effect which will magnify both contact pressure and corresponding compression stresses. The amplification effect is minimum for given values of Fi (or Fo) when the pressure contact point is at the groove ridge gr where the inclination of the loading reaction with respect to the horizontal line $\Lambda$ is $(\pi-\alpha)/2$. This $\alpha$ should preferably remain large, as well as W/d, whereas h1/r should remain as small as possible while h2/r remains as large as possible. There lies the crux of the matter. With the definitions listed above, equation $1=d'.\sin \theta$ becomes $1=W.\sin \theta$ (3), and as a first approximation, $W=\pi D^*/n.\sin \theta = \pi D^{*'}/m.\sin \theta$ (4). Equations (1), (2), (3) and (4) express the relationships that govern the interdependence of the critical parameters which determine and also limit the performance of the present invention drive system.

It is worth noting here that the longitudinal contour profiles of the imaginary quasi cylindrical surfaces previously defined are not machined surfaces but are only the result of the cooperating interferences of side walls of helical grooves intersecting themselves. Another system operation consideration is the desirability of the linearity of the variation of $\omega/\omega'$ or $\rho$ as a function of the sleeve travel or longitudinal displacement $\Delta$, shown in FIG. 13. Two typical cases are of interest as shown in FIG. 12: (1) the case of $\theta$ varying linearly as a function of $\Delta$, and (2) the case of the linear variation of $\theta$ as a function of a fully engaged ball position between 0 and $\Delta$. For reference and comparison, two curves corresponding to both cases are given in FIGS. 12 and 13. They give an indication of the amounts of the deviations that imposing a linear characteristic on one variable parameter has on the other one. A fully-engaged ball position is expressed in percentages of the full travel or displacement $\Delta$ of the sleeve and its straight grooves.

At this juncture, it will be useful to indicate significant values of $\rho''$ which the compounding effects of variations of $\theta$ and $\theta'$ by means of tan $\theta$ to tan $\theta'$ ratio may yield, between symmetrical meaningful limits of $\theta$ and $\theta$. $\theta$, $\theta'$, tan $\theta$, tan $\theta'$, tan $\theta$/tan $\theta'$ and attainable compounded ratios are given in Table A below.

TABLE A

Effects of Pitch Angle Compounding on Speed Ratio

| $\theta$ (degrees) | tan $\theta$ | $\theta'$ (degrees) | tan $\theta'$ | tan $\theta$/tan $\theta'$ | Total Ratio |
|---|---|---|---|---|---|
| 20 | 0.3640 | 70 | 2.747 | 0.1325 | 56.92/1 |
| 22 | 0.4040 | 68 | 2.475 | 0.1632 | 37.54/1 |
| 25 | 0.4663 | 65 | 2.145 | 0.2174 | 21.16/1 |
| 30 | 0.5774 | 60 | 1.732 | 0.3334 | 10/1 |
| 35 | 0.7000 | 55 | 1.428 | 0.4902 | 4.16/1 |
| 40 | 0.8390 | 50 | 1.192 | 0.7039 | 2.02/1 |
| 45 | 1.0 | 45 | 1.0 | 1.0 | 1/1 |
| 50 | 1.192 | 40 | 0.8390 | 1.4207 | |
| 55 | 1.428 | 35 | 0.7000 | 2.04 | |
| 60 | 1.732 | 30 | 0.5774 | 3.0 | |
| 65 | 2.145 | 25 | 0.4663 | 4.6 | |
| 68 | 2.475 | 22 | 0.4040 | 6.126 | |
| 70 | 2.747 | 20 | 0.3640 | 7.542 | |

The total ratio values indicated above correspond to the highest ratio $\rho''$ that could be obtained when the highest ratio of tan $\theta$/tan $\theta'$ is divided by the "symmetrical" lowest ratio of tan $\theta$/tan $\theta'$ then called unity (/1). This explains why no value is shown for it for values of angle $\theta$ lower than 45 degrees. One can see that such a continuously variable drive system is capable of yielding very large ranges of speed ratio variations, if no or very low torques are transmitted (not for transportation applications). For torque conversion applications, i.e. to exploit the variable speed adjustment feature, the considerations previously mentioned then come into play. Now practical limits need be established to that effect. Table B below gives values of sin $\theta$ and corresponding values of h''/r, W''/d, $\alpha$ and $\beta$ for various small values of $\theta$.

TABLE B

Influence of $\theta$ on Groove Dimensions

| $\theta$ (degrees) | h''/r | W''/d | $\alpha$ (degrees) | $\beta$ (degrees) |
|---|---|---|---|---|
| 20 | 0.060 | 0.342 | 40 | 140 |
| 22 | 0.073 | 0.375 | 44 | 136 |
| 24 | 0.088 | 0.407 | 48 | 132 |
| 26 | 0.103 | 0.438 | 52 | 128 |
| 28 | 0.117 | 0.469 | 56 | 124 |
| 30 | 0.134 | 0.500 | 60 | 120 |
| 32 | 0.152 | 0.530 | 64 | 116 |

The maximum value W' of W is practically equal to d within a few percents, thus W''/d is approximately equal to sin $\theta$ which is actually equal to W''/W'. The information contained in Table B is of crucial importance, for it reveals that pitch angles smaller than 30 degrees lower the values of h″/r below levels deemed acceptable. The value of h″/r (0.134) corresponding to θ=30 degrees is represented by line Λ' in FIG. 10. The helical groove becomes very shallow then and it is questionable whether large torques can be transmitted efficiently by means of such shallow grooves. Total ratio ρ' decreases rapidly as pitch angle θ rises above 30 degrees because of the compounding effect mentioned, as shown in Table A, assuming that θ' concomitantly decreases as θ increases, i.e. case of symmetrically varying pitch angles. However, the system design needs not be arbitrarily so restricted, i.e. (θ+θ') needs not be equal to 90 degrees, but could be larger. Other combinations of pitch angle correspondence are used as examples for calculating total ratio ρ' values that can be obtained with more compatible minimum values of 35 to 50 degrees for both θ and θ', while the maximum value of 70 (or even 75) degrees is maintained. The summarized results are presented in Table C below.

TABLE C
Influence of Pitch Angle Asymmetry on Speed Ratio

| θ (degrees) | θ' (degrees) | tan θ/tan θ' | Total Ratio ρ' |
|---|---|---|---|
| 35 | 70 | 0.2548 | 15.4/1 |
| 40 | 65 | 0.3911 | 6.54/1 |
| 45 | 60 | 0.7003 | 2.48/1 |
| 50 | 55 | 0.8347 | 1.435/1 |
| 55 | 50 | 1.198 | |
| 60 | 45 | 1.732 | |
| 65 | 40 | 2.557 | |
| 70 | 35 | 3.924 | |
| 40 | 75 | 4.448 | 19.79/1 |
| 45 | 75 | 3.732 | 13.93/1 |
| 50 | 75 | 3.131 | 9.8/1 |

The values of W‴/d (or sin θ) for such minimum θ values are provided in Table D below and corresponding positions of minimum W‴ value line Λ' are indicated in FIG. 10 by circled index numbers.

TABLE D
Minimum Groove Width Values for Various Minimum θ Values

| θ (degrees) → | 30 | 35 | 40 | 45 | 50 |
|---|---|---|---|---|---|
| W‴/d (sin θ) → | 0.500 | 0.573 | 0.643 | 0.707 | 0.765 |
| Index Number → | ① | ② | ③ | ④ | ⑤ |

Because of the effect of curvature near the groove bottom on the non-linear relationship between h″/r and W‴/d, the value of h″/r more than doubles, as does the value of tan θ, when the minimum value of θ increases from 30 to 50 degrees, a two thirds increase. However, the loss in tan θ is more than balanced by the increase in tan θ' which increases from 1.732 (θ'=60 degrees) to 3.732 (θ'=75 degrees) by increasing (θ+θ') from 90 degrees to 125 degrees. The conclusion of this cursory analysis is that total pitch angle tangent ratios ρ' of up to 80/1 for applications requiring small or negligible torque transmission, 25/1 for applications requiring moderate torque transmission, and 10/1 for applications requiring the transmission of torques such as those encountered in transportation vehicles, are obtainable.

Total ratio ρ' represents only the compounding of the tangent ratios which results from sleeve 106 travel Δ from one extreme combination of θ and θ' to another opposed extreme combination. Equations (1) and (2) include ratios (R/R') and (R'/R) respectively. Both R and R' may be replaced by D* and D*', respectively, so as to incorporate pitch diameter ratios in the two equations. In the invention embodiments presented thus far, D* and D*' have fixed values by construction. The ratio between ρ and ρ' is fixed for a given construction, and ρ and ρ' may be used interchangeably to express a range of speed ratios of which a given drive system is capable. However, it is conceivable that both D* and D*' can be made adjustable. This is briefly discussed below.

Pitch diameters D* and D*' have so far been construed as corresponding to two cylindrical pitch surfaces. Whilst difference (D*−D*') must practically remain fixed, D* and D*' could both correspond to concentric conical surfaces maintaining a fixed relative axial position. Sleeve 106 and its ball-channelling loops need only be made circumferentially extensible. To that effect, each minor loop must be separate and form a true closed loop. The continuous ball chain (major loop) described in FIG. 4 ceases to exist and, in FIG. 3, loop 116' leads balls back to straight groove 112 instead of 112' as previously described. The circumferential distance separating each minor closed loop is made adjustable by breaking the sleeve body into segments along section planes located between minor closed loops, each segment containing one inner and one outer straight groove. The longitudinal displacements of the segments are synchronized along fixed guide rods and provide longitudinal positional adjustments of the fully engaged balls between cooperating straight and helical grooves.

Helical Groove Discussion

The helical grooves are characterized by three main physical aspects: (1) the shapes of their cross-sections, (2) the manner in which their helix pitch angles vary, and (3) the limits of the helix pitch angle variations. Only circular cross-sections have so far been considered. This should not be construed as a limitation, other cross-section shapes may prove more advantageous for various reasons as discussed below, e.g. triangular, symmetrical or skewed. Characteristics (1) and (2) are somewhat interdependent for reasons related to groove machining. Characteristics (3) is determined mostly from performance considerations, as earlier mentioned, though having some influence on the other first two.

Helical Groove Cross-section Shapes

Circular cross-sections provide a ball/groove contact area a bit larger than that which a developable surface for the groove wall will yield. However, the surface finish which can realistically be expected with conventional machining for circular grooves may not be as high as that which grinding and lapping might achieve with developable surfaces. Furthermore, circular grooves are necessarily symmetrically shaped. It is evident that the largest torques transmitted, most of the time, result in point contact loads being always applied on the same side of the grooves. Thus it would appear advantageous to have the loaded side of the grooves rise at an angle steeper than that of the unloaded side, if practical, it is also the easiest to grind and lap. An idealized helical groove shape reflecting these considerations is shown by phantom line 200 in FIG. 10. Machining clearance recess 201 for grinding and lapping tools 202 is provided at the bottom of such a skewed triangular cross-section. A symmetrical triangular groove shape 203 is also shown for comparison.

If triangular grooves are used, skewed or symmetrical, the contact points between the balls and the grooves are necessarily always located at a fixed distance from line Λ (pitch cylindrical surface). Line Λ' corresponding to groove minimum width W''' must contain the contact points on the groove pressure side. If the section of the groove is skewed, the ball contact point located on the groove other side then becomes positioned below line λ' out of necessity. The depth of the groove has no longer the meaning or the importance previously given to that of circular grooves. h'' is equal to h2 and h1 is fixed. However, h' and W' still vary according to valves of θ or θ' so that the two helical surfaces of the grooves may still form the required sharp ridges.

The side surfaces of triangular helical grooves are developable, i.e. helically conical. For given constant values of d and β, W''' is determined by the minimum value of θ' or θ and W' maximum value may be limited to that given by equation W'=W'''/sin θ. W''' remains constant, but its projection lengths, e.g. 1 of FIG. 3, must at least satisfy the equation above or be larger. It is advantageous, nevertheless, to maintain the maximum value of W' projected length at values as low as possible so as to maximize the number of helical grooves that can be located on a given grooved surface. This will minimize the width λ' and length λ'' of the straight groove end pockets needed to facilitate the ball transfer from the guiding channel restraint to a full engagement/disengagement.

The same reasoning applies to circular helical grooves, but to a much lesser degree. The choice between triangular shapes and circular shapes for the helical grooves must be based on considerations much too complex for a necessarily limited discussion. Such considerations are: (1) ease of machining and cost thereof, (2) magnitude of the peak contact pressure loads to be transmitted, (3) linear velocity of the balls, (4) extent and quality of the available lubrication, and (5) trouble-free life expectancy of the drive system. These are a few examples of considerations that designers will have to analyze. Considerable testing will also be needed to establish design trade-off data. However, some conclusions may be drawn at this juncture: (1) the use of helical triangular grooves is more attractive when only unidirectional operation of the balls is needed and sizable torques are to be transmitted, (2) the use of helical circular grooves appears more attractive when very low torques are to be transmitted and/or when ball loading reversal is required, and (3) considerations regarding production costs and system performance will strongly influence the choice of drive system design, e.g. the use of ball travel reversal as compared to the use of dual helical groove arrangement (FIGS. 15 and 18 configurations).

Helix Pitch Angle

The importance of helical groove pitch angle variations and limits was earlier established. Once these are selected, the manner in which such variations occur remains to be chosen. In the case of fully manually operated drive systems, the simplest way of machining the helical grooves will be chosen. In applications where automatic control and adjustment of speed or torque ratios are used, the selection of the rate at which $\theta$ and $\theta'$ are caused to vary as a function of the longitudinal position of the fully engaged balls or of sleeve 106 remains to be made. In the first case, it may be simpler to let $\theta$ and $\theta'$ vary linearly with the longitudinal or axial distances separating the ball contacts from either ends of shaft portions 103 and 105, said ends being fixed and coinciding as illustrated in FIG. 1. The linear variations of $\theta$ and $\theta'$ between their minimum and maximum values (min. and Max.) as a function of of ball position are shown in phantom lines by straight lines in FIG. 12. Corresponding variations of $\rho$ as a function of $\Delta$ are illustrated by phantom line curve $\theta/\Delta = K$ (constant) in FIG. 13. Straight line $\theta/\Delta =$ Variable corresponds to a reference geometric progression of the variations in values of $\rho$ for linear variations of $\Delta$. With such conventions, the variations of $\rho$, $\theta$ and $\theta'$ are shown in FIGS. 12 and 13 in solid lines as a function of $\Delta$ or ball position. For the range of $\theta$ and $\theta'$ chosen in this example, because a meaningful speed ratio should progress geometrically between the ratio range limits, the influence of tan $\theta$/tan $\theta'$ ratio is not as influential as one might thick at first glance. As a rough approximation, for practical combinations of ranges and limits of $\theta$ and $\theta'$, it is realistic to assume that linear positioning of sleeve 106 could generally satisfy the requirements that a torque control system will impose on the relationships between torque variation sensitivity to sleeve travel and speed ratio adjustments required for such control.

Then assuming a linear relationship between the pitch angle variations and the ball position, it is of interest to determine how such variations affect the grooved shaft profile and concomitant groove widths. The case of circular grooves is shown in the graphs of FIG. 11 for a typical combination of linear variations, range and limits of angle θ. Diameter DI (FIG. 9) corresponding to all groove bottom positions is fixed and remains constant, regardless of ball contact location between the start and the end of sleeve 106 travel. For reference purpose, the case of conical surfaces for shaft portions 103 and/or 105 is illustrated in solid lines in the graphs. W and h represent the groove width and depth respectively, varying between limit values min. (minimum) and Max. (maximum). Horizontal line B represents the groove bottom. Symmetrical curves S' and S'' represent the developed width contour that the groove would assume on a conical surface having the profile depicted by straight line S. Because all helical grooves must be adjacent and form ridges (crests or cups) along the totality of their lengths, these ridges must be straight, i.e. as shown by symmetrical phantom lines P' and P''. The bulges exhibited by curves S' and S'' cannot exist. To eliminate them, line S must move down to assume profile line P shown in phantom line in the bottom part of FIG. 11. This occurs automatically when the helical grooves are machined. The steeper descent of curve P on the left side is caused by the steeper sides of the groove at higher values of h (i.e. h2), as evidenced in FIG. 10. This means that gap 150 (FIG. 9) increases more rapidly for higher values of θ or θ', for equal variations in sleeve positions.

Total Number of Balls and Ball Engagement Synchronization

The following applies to the basic configuration of FIG. 4 and in the case of forward (FD) speed operation. If the total length of the ball channel centerline (locus of the ball centers) is L*, with the previously defined total number of balls N* and their diameter being d, 1*=N*.d (5). The number of minor ball loops is p, providing p pairs of straight grooves. N* should preferably be as small as possible, which means that the minor loop lengths should be as small as possible. If at least six balls are constantly and simultaneously fully engaged in six straight grooves (three ball pairs and three balls per shaft) in the straight portion of a groove having a length d, the value of N* can easily be determined accordingly. Two factors affect the realization of such a simple condition, they are: (1) the influence of tolerance stack-up, and (2) the presence of the ball transfer zones or end pockets located at both ends of the straight grooves.

The first factor can be eliminated by matching the length of a stack of N* balls and the total length of of the ball channel. The walls of the latter are defined by the wall of a tube formed to assume the coiled shape shown only partially in FIG. 4. The tube inner diameter d* is only a few thousandths of an inch larger than d that may be caused to vary from ball to ball by increments of one thousandth of an inch, three of such increments being sufficient. Diameters d and d* are at least twenty to fifty times larger than the maximum clearance amount which may result from such adjusted values of diameters d and d*. When balls are stacked up in a tube under such conditions, the maximum variation of tube length $\Delta X$ occupied by two touching adjacent balls in the stack is d.$(X/d)^2/2$ as a first approximation, where X is the maximum lateral displacement that each ball is allowed. The relative variation per ball of the ball stack-up length is equal to half of the square of the relative ball lateral displacement allowed. In the maximum case of X/d=1/20, this means a possible variation of d/800 for X. In the minimum case of X/d=1/50, it means that $\Delta X$ could be as low as 0.0002d. The number of balls per minor loop could be as low as 15, if valve 120 is not used for reverse speed operation. Assuming a value of 12 for p, N* could be limited to values lower than 200. This means that the influence of the tolerance stack-up can either be ignored for small values of X/d or be utilized to match ball stack-up and channel lengths by using larger values of X/d.

The straight groove end pockets present a problem much more complex and difficult to analyze. Balls cannot be packed tightly in both the minor loop channels and the straight groove end pockets. There is no doubt that, for some positions of the sleeve, ball jamming-/binding would then occur. In addition to the shaping and dimensioning of these end pockets already described, two design parameters are available: (1) X/d just discussed, and (2) the range of $\theta$ and $\theta'$ variations. It should now be evident that large speed ratio ranges are obtainable by concurrently decreasing $\theta$ (or $\theta'$) adjustable range and substantially increasing the minimum value of $\theta$ (or $\theta'$). For instance, the combination 50/75-75/50 of Table C yields a value of 9.8/1 for $\rho'$ almost equal to that provided by the combination 30/60-60/30 of Table A (10/1). However, $\theta$min. is increased by 20 degrees, whereas the maximum value of $\theta$ is increased by 15 degrees only. Referring back to Table D, one sees that the minimum width W''' of the helical groove increases over 50% and that the variation from W''' to W' is more than halved by increasing $\theta$min. a mere 20 degrees.

It is believed that combinations of X/d, of the minimum and maximum values of $\theta$ (and $\theta'$), of $\lambda'/d$ and $\lambda''/d$ values, and of shapes of contours 142-143, 153 and 210 (FIGS. 6, 7 and 8) can be arrived at that will provide the assurance that a ball is always enabled to fully engage any straight-groove/helical-groove constraining walls from an end pocket space. It should also be mentioned that both shapes and dimensions of all end pockets need not be identical. In most applications, the input shaft rotates in one direction only and the corresponding end pockets never reverse their roles. Ball disengagement is not a problem. The sides of ball-engaging end pockets need not be symmetrical then. Such considerations will also alleviate the problem. Reverse speed capability can be provided by means that do not require ball direction reversal. Thus many design trade-off features are present.

It should also be remembered that three balls need be fully engaged simultaneously, though this does not mean that the three balls much become engaged simultaneously. Quite the contrary, it is preferable that balls do not become fully engaged simultaneously but sequentially. So as to facilitate this occurrence, the ball transfer from an end pocket space into the straight portion of a groove can be further eased by adjusting the radius of curvature of transition curves 210 that connect the groove straight sides to the funnel-shaped sides 137 of an end pocket. The straight portions could concurrently have a length slightly shorter than d. It should be remembered also that gap 150 is large enough to accommodate a situation where diameters D2 and D2' could extend beyond line PL to a degree larger than any diametrical play that might exist between a straight groove bottom and the balls, so that a tight lateral ball restraint is always provided. Thus synchronization of ball engagement is to be avoided by construction and the probability of synchronization happening should hopefully be concomitantly eliminated. The above discussion shows that enough design flexibility is provided in the drive system to such effect. Only extensive design and concomitant experimental work will enable designers to combine the various types and degrees of the trade-offs available as outlined above. Only then will designers be enabled to tailor and to optimize a drive system design for a specific application.

Component Loads and Supports

The loading and supporting of six main components should now be discussed. These components are: (1) structure 111, (2) input shaft 102, (3) output shaft 101, (4) sleeve 106, (5) guide rods 107, and (6) member 163. As previously mentioned, forces and reactions thereto are created at the two pitch surface locations, or nearby, by the physical interactions of: (1) helical grooves 114 with balls 109, (2) balls 109 with sleeve 106 inner straight grooves 112, (3) balls 110 with sleeve 106 straight grooves 113, (4) balls 110 with helical grooves 115, (5) sleeve 106 with guiding rods 107, (6) sleeve 106 with any axially restraining structure, and (7) member 160 with any axially restraining structure. These reactions result in loads applied directly to structure 111 such as: (1) the reactions exerted axially on the two shaft, (2) the reactions applied laterally on the guide rods, and (3) the reactions applied axially by the sleeve/member command-rods/springs. It is obvious that extensive side loading of structure 111 is prevented from being applied by the symmetry of the application of these reactions to the two shafts. Portion 103 of the input shaft absorbs these reactions in compression and portion 105 of the output shaft absorbs these reactions in a hoop tension loading mode. Thus in comparison with most gear systems that generate side loading of the gear-supporting structure, the present drive system does not generate similar type of side loads.

At least for applications to automobiles, buses and trucks, all transmission systems are mostly used for forward (FD) speed operation. Torques and shaft speeds are the highest then. It appears then that the most severe axial loads developed by the two shafts are directed in fixed directions. Examination of FIG. 15 and 16 drawings reveals that shafts 101 and 102 can very easily be connected by means of a rotation-compliant joint. The latter is needed to accommodate relative rotations between both shafts. Referring to FIG. 17 diagram, one sees that axially-directed forces Fb and Fb' may be oriented either in the same or in opposite directions, depending on the orientation of helical grooves 114 and 115. Helical groove orientation arrangements that cause the shaft axial loads to oppose each other should be favored, thereby practically disposing of axial loading of structure 111. The end result is similar to that which herringbone gear configurations provide with meshing helical gears.

Bearings 211 (FIG. 15) and 212 (FIG. 16) are thrust bearings designed to sustain thrust mostly unidirectionally. They can also contribute very effectively to the support of the cantilevered end of the input shaft. These thrust bearings also operate at angular speeds lower than those which are imposed on the support bearings located between the shafts and structure 111.

Sleeve 106 is subjected to two main types of loadings, one axial or longitudinal, another transversal or lateral. The axial loading results from the changes of direction imposed locally on the balls at the ends of each minor loop. These loads are resisted internally by sleeve 106 body structure. Their magnitude is function of the magnitude of forces Fb. The sum total of all axially directed loads applied on sleeve 106 body is resisted by either a spring action, e.g. springs 178 in FIG. 16 case, or an actuated command rod, e.e. command rod 173 in FIG. 15 case. The resulting axial loads exerted by sleeve 106 on either springs 178 or command rod 173 vary in first approximation as the magnitude of the transmitted torque. They also vary as a function of the values of $\theta$ and $\theta'$, hence as a function of the sleeve position. A detailed evaluation of such resulting axial loads is beyond the scope of this disclosure.

Forces Fi and Fo of FIG. 17 diagram are directly related to input torque and output torque, respectively. They must necessarily be of opposite directions. The reactions of these two forces on the straight groove sides oppose each other by means of the sleeve body and to a large extent cancel one another. Their differences exert a torque on sleeve 106 body which must however be prevented from complying to such solicitation. Guide rods 107 of course provide the restraint needed to that effect. The differential torque amount is transmitted by rods 107 to structure 111. Rods 107 are loaded and operate like cantilevered beams, which are structurally inefficient. Four means are available to minimize the degree of such inherent inefficiency: (1) elongating the rod cross-section in the direction of beam deformation, (2) providing some degree of support at the beam free end, (3) providing tight guiding of the guide rods by bores 108, and (4) causing the loads to peak when the sleeve is closest to the beam supported end. In the present case, all four means can be used concurrently. Therefore it is believed that bending deformations of rods 107 can be maintained below the critical level at which the sleeve guiding and restraining could be affected.

If member 160 is used, whether its axial position is determined by means of spring 179 or command rod 180, force Fb reaction is applied axially in full on member 160. Depending on the value of angle $\theta$, i.e. the position of sleeve 106, the relationship between Fb and Fi, thus the input torque, is fixed and known. This arrangement is used later as model for torque control discussion. Although spring 179 in FIG. 16 is shown located at the back end of member 160, as was mentioned in the preceding section, it may as well be located on the front end side. The reason for favoring the latter construction is inferred in the preceding paragraph, i.e. to maximize the rigidity of rod 107 mountings to structure 111.

Reverse Speed and Torque Control

The rotation speeds of piston engines, the speed ranges, the rear axle gear ratios and the wheel sizes of most motorized vehicles used for transportation are such that the gear ratio ranges of most gearboxes correspond mainly to a reduction of the engine rotation speed (rpm). There is no valid reason for altering this situation. The overall total speed ratio ranges indicated in Tables A, B and C are all expressed in the form "xx/1". They might as well be expressed as "1/xx" in fractional form and all smaller than 1. Also as a general rule, maximum input torque levels are needed at the low end of the gear ratio range. Combining these two considerations results in preferentially arranging helical grooves 114 so as to locate their ends where $\theta$ is smallest ($\theta 1$) at the left end of shaft portion 103 (FIGS. 3, 15 and 16). Sleeve 106 then moves in arrow f* direction to increase the speed ratio to higher values up to the point where $\omega = \omega'$ and beyond. The values of $\theta$ and $\theta'$ at which this happens is of no importance here.

Three approaches were described in the preceding section for reversing $\omega'$. The simplest approach is schematically shown in FIG. 14 where input shaft 100 rotates in only one direction (f), output shaft 101 is enabled to rotate in either direction (f''), and intermediary shaft 100' may possibly also rotate in either direction (f'). In principle, the relative positions of the drive system of the present invention and of the rotation inverter between shafts 100 and 101 should be immaterial. However, in view of the preceding discussion regarding the desirability of a single rotation direction, it is deemed preferable to assume that shaft 100' is generally also limited to one rotation direction. In such case, the drive system occupies position 214 and is controlled by command signal 215. The speed inverter occupies position 216 and is monitored by command signal 217. In such a construction, the range of reverse speed ratio is the same as that of the forward speed ratio. This embodiment might be of great interest for applications in which a large range of reverse speed ratio is desirable, e.g. some types of tractors, earth moving equipement, tanks and the like.

The next simplest reverse speed construction is presented in FIGS. 15, 16 and 18. It applies ideally to most motorized transportation vehicles. First, three general common traits should be mentioned at this juncture: (1) the range of reverse speed (RV) ratios required is narrow, (2) the RV ratios needed for RV operation correspond to those at the low end of the forward (FD) ratio range, and (3) shifting operation from FD to RV should be possible only when the sleeve is already at the low speed ratio position. As examples of system operation, FIG. 19 schematic diagram depicts the manner by which FD and RV selection could be made by a vehicle operator. Typical positions of a speed-ratio adjusting lever are shown for both FD and RV operations, ① to ④ for FD and ①' and ②' for RV. Such positions could be fixed, e.g. by means of notches, or represent selectable ranges of ratios. Each numbered position corresponds to a set longitudinal position of sleeve 106 or a set combination of $\theta$ and $\theta'$ values, hence a speed ratio. Neutral is represented by $\text{\textcircled{N}}$ and a lateral displacement of the ratio selection lever is required to shift from FD to RV. Sleeve 106 position at location $\text{\textcircled{N}}$ corresponds to adjacent balls 109* being both simultaneously engaged in circular groove 164 of FIG. 18. In the case of FIG. 15 system configuration, groove 164 is located on the outer helically-grooved surface of member 160. $\text{\textcircled{N}}$ selection is made by means of member 160 positioning.

In the most general case, the IV feature of the drive system of the present invention is best exploited if automatic control of the input shaft torque is concurrently provided. The uses and advantages of an automatic torque control in association with an IV feature, in the case of hydraulic torque conversion, are fully described and discussed in my U.S. patent application Ser. No. 929,096 filed Nov. 10, 1986, entitled VARIABLE SPEED POWER-TRANSMITTING SYSTEM. This is summarized below. The concurrent utilization of engine torque control and engine rpm automatic adjustment enables the engine/vehicle (piston engines) to operate in a manner such that:

1. the vehicle velocity can be automatically regulated at engine rpm and torque combinations that will maintain minimum fuel consumption, at all times, by monitoring rpm and torque;

2. continuously varying combinations of optimum engine rpm and torque is possible during vehicle acceleration so that maximum vehicle acceleration is provided, without wasting fuel;

3. vehicle cruise velocities can be automatically adjusted so as to maintain the engine operating at regimes corresponding to minimum specific fuel consumption of the engine.

The control systems and the technology of rpm and torque sensing, of fuel metering and vehicle velocity sensing are state-of-the-art and need no elaboration. These can be applied to the subject IV drive system for adjusting speed ratios by concurrently setting or adjusting the input shaft torque levels. The preceding description and discussion have shown that the concurrent use of sleeve 106 and member 160 is possible and practicable, to the extent that both may simultaneously and independently be adjusted by means of externally applied commands or signals. In the following however, manual monitoring by a vehicle operator of command rods 172, 173, 177, 107' and/or 180 is contemplated here. This does not however exclude and/or preclude the utilization of automatic control systems replacing such manual monitoring for enabling the present invention system to provide the capabilities 1. to 3. listed above and should not be construed as a limitation.

The manual adjusting of torque levels in parallel with speed ratio adjustments is illustrated in the schematic diagram of FIG. 19, where three torque level positions are shown as $\text{\textcircled{T1}}$, $\text{\textcircled{T2}}$ and $\text{\textcircled{T3}}$. Here again, these positions may correspond to either a fixed position or a range. In such a simplified manual arrangement, the operator adjusts two levers, one for speed ratios and the other for engine torque operating level. In this arrangement, torque level adjustment may also possibly apply to RV operation. In any event, using FIG. 16 as a system configuration model, the three torque level positions correspond to three longitudinal positions of guide rods 107' and thus to three amounts of compression of spring 179. Each spring compression amount corresponds to a set level of force Fi and thus to a set engine torque level, regardless of the value of angle $\theta$ or the position of sleeve 106. Within the limitations imposed by the force/compression characteristics of spring 179, member 160 will slide on its splines 161 so as to vary the value of $\theta$, for a fixed position of sleeve 106. These variations of $\theta$ cause concomitant variations of $\omega/\omega'$, although $\theta'$ maintains its value. $\theta'$ value will change only if sleeve 106 position is changed. A similar type of reasoning can be made if sleeve 106 is used for torque level adjusting and member 160 is used to vary $\theta$ in response to a need to adjust $\omega/\omega'$.

A third construction was earlier described for shifting from a FD operation to a RV operation of the system. It involves the use of ball-flow-inverting valves 120 located in sleeve 106 body, as shown in FIG. 5. In this arrangement, the directions of balls 110 in straight grooves 113 becomes inverted and the rotation direction of shaft portion 105 is reversed. The number of valves is 2p and extra balls are constantly lodged in the valve body (duct 123), and in detouring channels 121 and 122. The diameter of valve 120 body corresponds exactly to either 3d (case of FIG. 5) or could be as small as 2d. In any event, it must be an exact integer multiple of d. The lengths and shapes of channels 121 and 122 must also be such that exact whole numbers of balls fit in these channels. For reasons previously discussed, whether valve 120 is closed, open or in a transition phase, the length of the ball centerline path from point a to point b cannot vary. Concomitantly, the length of the continuous channel major loop cannot be affected by the operation of valve 120. It is understood that in this construction, a clutch must be provided between the engine and the drive system so that rotation of input shaft 100 stops when the drive system operating mode is being shifted from FD to RV or vice versa, while the engine is idling. It is worth mentioning here that such requirement is not mandatory if the RV operation is achieved by means of the construction illustrated in FIGS. 15, 18 and 19, circular groove 164 could play a role similar to that of a clutch. The synchronization of the rotation of valve 120 bodies can easily be achieved. However, during a fraction of such rotation, means need be provided to insure that the conditions regarding both ball contacts at points a and b are met and that the positions of balls in channels such as 116 and 116' are not affected. To that effect pins having specially shaped and varying cross-sections, and slideable along a lateral direction perpendicular to FIG. 5 section plane, are used for altering the ball channel contours at locations 125, 126, 218 and 219.

Pin sections 220 and 221 shown in dotted lines are laterally inserted for FD operation, whereas pin sections 222 and 223 are laterally inserted for RV operation wilst pin sections 220 and 221 are laterally retracted to be replaced by pin sections located contiguously thereto which have section shapes conforming to the alternate channel profiles required to insure a smooth flow of the balls. The drawing of FIG. 20 indicates schematically how this can be accomplished. A portion of sleeve 106 corresponding to the sleeve portions illustrated in FIGS. 2 and 4 is shown in phantom lines and depicts an end view of a few ball channels in which outlines of valve 120 and of the slideable pins are indicated in dotted lines. Guide rods 107 and actuating stems 225 of valve 120 and slideable pin positioning mechanisms 226 are shown sectioned and in solid lines because they extend the full length of sleeve 106 and beyond to structure 111, at one end.

Each one of positioning mechanisms 226 essentially includes one square-section actuating stem 225 that extends to a support on structure 111. All stems are enabled to rotate simultaneously and synchronously about their longitudinal axes in the direction of arrow f in response to operator's actions, but are prevented from moving axially by their rotatable connection to structure 111. Sliding bushings 227 are prevented from moving axially inside their lodgings in sleeve 106 structure but are free to rotate with their associated centering and supporting stems 225. Thus, bushings 227 are enabled to transmit any angular orientation imposed upon their associated stems. Bushings 227 are connected to both valve 120 axles 127 and the slideable pins by means not illustrated in FIG. 20, but well known in the art such as rack and pinion or cam. It is understood that all the elements discussed here have only two fixed positions, one position corresponding to FD operation and another corresponding to RV operation. Also, because the motions of stems 225, bushings 227 are synchronous and simultaneous, all valves 120 and slideable pins move in unison.

In FIG. 5 only two ball-flow detouring chanels 121 and 122 are shown as examples. A second pair of such detouring channels is needed to connect upper portions of channels 116 back to the lower portions of channels 116'. A second set of valves 120 and of slideable pins is also needed to suitably outfit these channels. FIG. 20 shows that 2p actuating stems 225 can be located within sleeve 106 body. FIG. 5 indicates that all slideable pins ought to be located on the half-turn end elbows of minor loops. Valves 120 should be located somewhere half-way between straight grooves 112 and 113, and also half-way between facing loop end elbows. Also, half of the pins are located near the sleeve inner surface whilst the other half is located near the outer surface. Basically, spaces needed for accommodating both the valves and the pins within sleeve 106 body are distributed between five distinct locations for each minor loop. Three sliding bushings 227 can be positioned on each actuating stem 225. Each pair of pins such as 220-222 and 221-223 may share a common bushing. Two adjacent valves may also share a common bushing. Furthermore, actuating stems located between guide rods 107 and two adjacent valves may monitor bushings that control both two adjacent valves 120 and two pairs of pins, one pair at each end of the sleeve.

Theoretically, enough actuating stems 225 and sliding bushings 227 can be provided to service both valves and pins. However, the amount of space required within sleeve 106 body beyond and above that which is needed to accommodate FD operation only may be prohibitively large, not to mention the extreme complexity and cost of such additional mechanisms. These disadvantages should be weighed against the advantage of obtaining symmetry between FD and RV operations in terms of speed ratios available in both operation modes. In FIG. 20, typical motion modes of both pins and valves are indicated by appropriately directed arrows.

Manufacturing Considerations

Considerations of and disussion regarding manufacturing are limited to those aspects that are common to all embodiments and apply to features deemed generic to the present invention. These are: (1) the helical grooves with variable pitch angles, (2) the channelling of balls in the sleeve, (3) the walls of the end pockets of the straight grooves, and (4) the straight groove side walls. Manufacturing aspects specifically applicable to only one alternate embodiment or that are deemed state-of-the-art are excluded from the discussion below. The slideable pins and associated ball-flow inverting valves are examples of such exclusions.

Helical Groove Machining

The shaping of the helical groove surfaces requires unusual machining approaches because their helix pitch angles must vary with longitudinal location and also because only one side of the groove wall is expected to be effectively utilized in the most general use cases. There is no doubt that the surfaces on which the balls are forced to roll or slide must have adequate degrees of finish and hardness. The wall surfaces of helical grooves with circular cross-sections can be ground with grinding wheels shaped to match those groove cross-sections and rotating around an axis perpendicular to the helix and maintained at a fixed distance of the centerline of the grooved portion of the shaft. As the shaft rotates while retaining a fixed longitudinal position, the grinding wheel is caused to advance parallel the shaft axis while the grinding wheel plane is concurrently caused to slowly rotate about another axis passing through the lowest point of its contact curve with the surface to be ground and perpendicular to the wheel rotation axis. The advancing motion of the wheel and its orientation adjustment are coordinated and synchronized in a manner such that contact curve previously defined progresses according to the programmed variations of $\theta$ (or $\theta'$) with longitudinal location. The wheel diameter is much larger than d.

Because of the groove cross-section circular shape, this grinding method imposes limitations on: (1) the minimum ratios $h'/d$ (FIG. 10) or relative groove depths that can be machined, (2) the total range of variations of $\theta$ (or $\theta'$), (3) the variation rates of $\theta$ (or $\theta'$) as a function of longitudinal location, and (4) the duration of the grinding wheel useful life before wheel reshaping and redimensioning are required. Limitations (1), (2) and (4) can be eliminated by removing the constraints imposed by the requirement that groove cross-sectional shapes and grinding wheel profiles be identical, in the case of circular grooves. As a rule, it is preferable that the grinding surface of the wheel have either cylindrical, conical or planar shapes, as is well known in the art. For this reason, triangular-shaped helical groove cross-sections were described earlier in this section. Grinding wheel 202 rotating around its shaft 230 in FIG. 10 shows how the two coordinated motions previously described in the circular groove grinding wheel case can be adapted to machine helical surface 200. In this instance however, the helical surface to be ground must exhibit no concavity at any point along its helically-wound length if the grinding wheel is to be and remain flat. In such case, the grinding wheel may be caused to move in a circular fashion about an axis parallel to that of shaft 230, as is usually done in the art of planar grinding. Slightly curved convex helical surfaces can also be ground in this manner.

In the cases of both the input shaft and member 163 (or 160), ample clearances exist at each end of the component and around the component for accommodating the grinding wheel and its shaft. This is not the case for portion 105 of the output shaft. Either a machining relief 231 (FIG. 15), much larger than the one shown, must be provided or shaft portion 105 helical grooves must be machined in an open-ended sleeve which is later pressed into shaft portion 105 outer cylindrical structure or brazed thereto. The inner diameter D2' of the helically-grooved surface is however large enough to accommodate grinding wheel 202 and its shaft.

If the groove helical surface exhibits some degree of concavity, the grinding surface of wheel 202 cannot be flat. However, that surface could be made slightly spherical, the radius of the sphere being equal or smaller than the concavity smallest radius. Because the ball contact point (gr in FIG. 10) with surface 200 does not vary with $\theta$ or $\theta'$, if surface 200 maintains a fixed inclination (constant value of h2), such a spherically-shaped grinding wheel could also be given a small circular side motion. Finally, the inclination of helical surface 200 could be rendered dependent on $\theta$ and/or $\theta'$ while angle $\beta$ is concomitantly adjusted so as to maintain the ball center at a fixed distance from the common axis of rotation. A variation of the orientation of shaft 230 of the grinding wheel as a function of $\theta$ (or $\theta'$), hence of the wheel location along the groove, could easily be provided to that effect. The programming of such type of machining by means of synchronized simultaneous linear and rotational tool positionings or displacements is now state-of-the-art.

Ball Channel Fabrication and Forming

Channelling the balls between the inner straight grooves and the outer straight grooves in an accurate and repeatable manner is a requirement previously emphasized. The machining of such a complex closed surface to its final shape, i.e. combination of the drawings of FIGS. 4 and 5, is impractical. However, straight tubes having a very accurate inner diameter (ID) and good surface finishes are commercially available in a variety of suitable metals or alloys thereof. Also techniques for bending such tubes accurately, whilst maintaining their ID, exist and are state-of-the-art. Basically, two fabrication methods of the ball channels are basically related and worthy of consideration. They both include the shaping and dimensioning of channel curved ends. In a first method, each one of these curved ends is similar to a sliding tubular element of a trombone. These elements are inserted and positionally adjusted in pre-drilled lodgings in the sleeve body. They then connect with inclined holes, also drilled in the sleeve body, which open into straight groove end pocket spaces. The tube sections may be brazed in place in sleeve 106 structure, or restrained in a fixed position. The curved ends of the tube sections are not embedded in the sleeve body and protrude therefrom so that exact positioning of these tube sections is possible, so as to obtain each individual channel length required.

If the curved ends are brazed, the total channel length must be adjusted prior to brazing. Thereafter it is fixed. However, if the curved ends are allowed to slide, thereby enabling the adjustment of their longitudinal positions ever so slightly, each minor loop effective length becomes adjustable at will when the balls are in place and the system is operating. The amount of adjustment needs only be a few thousandths of an inch for each curved end, which should not affect the ball rolling (or flow) over such a narrow gap (a negligible fraction of d).

In the second fabrication method, the complete closed major loop formed by the individual channels, the straight grooves and their access (or exit) ramps is obtained by suitably bending and shaping a given length of straight tube which corresponds to the length of the major loop, or total channel length. Sleeve 106 body structure is then constructed by positioning and then brazing pre-stamped and partially machined structural elements that provide: (1) the means for connecting the sleeve to either a command rod system or a spring system, (2) bores 108 for housing guide rods 107, and (3) the structure bulk needed for later finish-machining the straight grooves and their end pockets, as discussed further below. In this instance, the total length of the major loop can be obtained with great repeatable accuracy. However, the bending of many "blind" sections located in series may prove far more difficult and less satisfactory than the simple bending of the individual separate curved ends described for the first method, in terms of accuracy of the curved section ID's. Trade-off possibilities are provided here. Designs combining the most attractive elements and features of each fabrication method will eventually be arrived at. The type of application and its requirements will greatly influence the designer's choice of features.

Forming/Machining of Straight Groove and End Pocket Walls

The manner by which the cavities needed for housing the balls are formed depends on the method used for the ball channel fabrication. The machining and final surface finishing of the walls destined to contain and guide the balls are similar in all cases and for all methods. In the first fabrication method case, cavity walls are machined directly into the sleeve body, although they may be pre-formed by casting, forging or stamping. The curved end tubes are not however affected by such pre-forming and later machining. In fact, their presence during the cavity wall machining may be undesirable. In the second fabrication method case, continuity of the tube wall is essential and unavoidable. The tube wall, or part thereof, must become integral part of the cavity walls. Thus, this second fabrication method should include steps that incorporate the pre-forming of the final open cavities.

To that effect, after the minor loops have been formed and shaped, and before the sleeve individual structural elements are assembled with the shaped major loop, portions of the tube located as shown in FIG. 4 by reference 233 are slit, heated, caused to become open and then stamped into the approximate shape which the final machined walls will have. The internal dimensions of the open cavity thus formed are slightly smaller than the dimensions of the machined cavity. The individual structural elements that are subsequently assembled with and brazed to the looped tube are also shaped to espouse the external shape of those formed tube portions. The brazing operation causes the tube deformed and open walls to become well supported and integral part of the sleeve structure thereafter. The tube wall thickness is larger than the amount of metal to be machined off later. At this juncture, the machining of the cavity walls becomes indentical in both cases, i.e. multiple separate curved end tubes and one-tube major loop channel.

The wall surfaces of the straight portions of the grooves require grinding, hardening and possibly lapping because they transmit the torque to the balls. The length of the end pockets provides enough clearance space for accommodating a small grinding wheel of adequate diameter. The surfaces enveloping the end pockets have double curvatures and require grinding along contours such as 210, 153, 137, 142–143 and 151-152. This can easily be performed by a grinding ball that has a diameter equal or slightly smaller than the smallest radius of curvature of any concave portion of the end pocket machined surface. It is believed that the center of such a grinding ball can be accurately positioned step by step by means of a digitally programmed positioning control system, as is now practised in the art of precision machining. The envelope of the plurality of wheel spherical grinding surface positions then defines the end pocket wall surface. It should be remembered that balls channelled between the walls of the end pockets do not transmit torque but only axially directed forces, i.e. Fb to Fb'. The magnitude of the side forces exerted by the balls on the end pocket walls is small compared to that of the axially transmitted forces. Thus it is believed that the degree of surface finish obtainable with such grinding will not affect the ability of the balls to flow into groove 112 and 113 straight portions.

IV Positive Drive System Applications

Only two best known and understood applications of the IV positive drive system of the present invention are discussed below. This does not mean that those are the only applications of this novel approach to transmitting torques and rotational movements, but they represent everyday applications to commonly used means of transportation and/or exercizing. The principle of utilizing the combined and synchronized motions of circulating balls between pairs of sets of two cooperating grooves to replace two meshing gears and assume their function can be applied to any and all mechanisms or machines in which gears are used. Over a time period covering the engagements and disengagements of either several gear teeth or several balls, transmitted torque and speed ratios do not differ as to their average values, slippage being non-existent in both cases. However, instantaneous variations of either torque or speed ratios could be more pronounced in the case of the ball system for reasons earlier pointed out. The advantages of the ball system are twofold: (1) most importantly, both the torque and speed ratios can be adjusted by means of an infinite number of steps of infinitely variable magnitudes, and (2) the input and output shafts share a common axis, which results in the possibility of utilizing length space along such axis as trade-off for transversal space or bulkiness.

Therefore, gear applications where those two advantages more than compensate for the disadvantage of greater instantaneous variations of torque and speed ratios could benefit from the use of the IV positive drive system. Transportation represents an application field where the IV capability far outweighs drawbacks of enhanced instantaneous variations of torque and speed ratios. However, any other application, commercial and industrial alike, in which such IV capabilities also outweigh those drawbacks, can advantageously make use of this new approach. In the transportation field, a distinction can be made between two types of vehicles. Such distinction is based on the need for speed reversal capability, if the latter is to be made integral part of an IV ball drive system, especially if FD and RV speed ratio symmetry is advantageous. Applications to two basic types of vehicles are of most interest: (1) two-wheel vehicles or cycles, and (2) four-wheel vehicles (automobiles for example). These two transportation applications are discussed below and divided according to this classification, i.e. cycles (bicycles being used as a model) and cars. Both types of vehicles can very advantageously benefit from another feature of the present invention, i.e. its inherent capability to provide some kind of input shaft torque control.

Application to Bicycles

Some of the following could in general also apply to motorcycles, thus a specific distinction is not drawn between the two. It is assumed here that bicycles are generically representative of all cycles. However, one basic difference between motorbikes and bicycles should be noted, i.e. the manner in which the powering torque is both generated and applied to the input shaft. The torque generated by the engine of a motorbike can be considered constant for the purpose of this discussion, but the torque generated by a rider's pedals cannot. The latter varies from approximately zero at a peak value twice during each revolution of the pedal axle. On the other hand, torque control on a motorbike does not offer the valuable advantages that it offers for cars.

For well over sixty years, efforts have been made to adjust the rotational velocity of bicycle rear wheels with the up-slope of the bicycle path. To that effect, a most commonly used mechanism called DERAILLEUR was developed to adjust the ratio of the rotational speeds of the pedal axle and of the rear wheel shaft. The available number of fixed ratios has gradually increased during the inventor's lifetime from three to up to fifteen or even eighteen. The total range of speed ratio adjustment available varies between 5/1 to possibly 7/1 by means of up to fifteen fixed ratios obtained by combining three large pedal wheel sizes with five pinion wheel sizes. Chain shifting is not simple and is bothersome so that the full capability of speed ratio adjusting is seldom properly exploited. The object of speed ratio shifting is of course to limit the peaks of the foot pressure exerted on the pedals to values most comfortably sustainable for the rider. Thus torque control is neither possible nor advantageous in such case. Ideally, a rider should only need adjust a speed ratio deemed optimum for the road grade ahead and set a foot/pedal pressure level that cannot be exceeded, but which the rider may adjust at any time, depending on fatigue or eagerness degrees. It should also be mentioned here that the diameters of bicycle wheels, the practical rpm regimes of which riders' legs are capable and the velocity range of bicycles combine to establish a rather well defined range of practical speed ratios between the pedal axle and the rear wheel shaft rpm's. Using a realistic 1/1 value for the lowest ratio, this means that all other higher ratios are obtained by increasing the speed ratio to the upper limits cited previously, e.g. 5/1 or 7/1. These upper values are well within the total ratio $\rho'$ listed in Table C, neglecting the influence of the pitch diameter ratio. Combinations of $\theta$ and $\theta'$ ranges, e.g. 40-65/65-40 or 48-72/72-48, corresponding to very practical values of the two pitch angles can easily provide the extreme speed ratio adjustments provided by the most complex derailleurs.

The invention embodiment shown in FIG. 16 may be used as model of such bicycle-adaptable IV drive system. The rider has two adjustment control: (1) a first handle for adjusting the axial position of sleeve 106, and (2) a second handle for setting an upper limit to the torque which member 160 can transmit. The first handle is connected to command rod 173 of FIG. 15 and the second handle is connected to axially-adjustable guide rods 107' so as to adjust the amount of compression of spring 179. For any given axial position of member 160, a fixed axial position of sleeve 106 corresponds to a set speed ratio. A given position of guide rod 107' imposes a fixed axial position on spring 179 right end. Variations in pitch angles $\theta$ and $\theta'$ along axial directions and spring 179 force/compression characteristic are such that a further compression of spring 179 by member 160 causes pitch angle $\theta$ to decrease, thus concomitantly causing the speed ratio to decrease, though sleeve 106 position remained fixed.

In an alternate and complementary operation, whenever the axial-position self-adjusting of member 160 by means of spring 179 compression reaches limits deemed unsuitable by the rider, the axial position of sleeve 106 may then be reset. This adjustment could be upward or downward depending upon the road grade change direction and/or the rider's feel of the road and riding conditions. The torque limiting function of member 160 can then be resumed over a different range of speed ratios. As was earlier mentioned, depending on the most suitable means for representating torque, i.e. by means of either member 160 or sleeve 106, the roles played as described above by member 160 and sleeve 106 could be reversed. Depending on its size, an IV drive system adapted to bicycle use could be located inside an enlarged pedal axle hub or between the pedal axle and the rear wheel shaft. In the first design, a two-single-sprocket/chain arrangement will connect the IV drive system output shaft to the rear wheel shaft. In the second design, the IV drive system input and output shafts may be connected to the pedal axle and the rear wheel shaft respectively by a dual axle/bevel-gear arrangement. Both arrangements can provide a fixed speed ratio correction to compensate for the influence on $\rho$ of the pitch diameter ratio (see Equation (1)).

Application to Cars

The following applies to buses, trucks and similar transportation vehicles. The extensive discussion presented in the reference previously cited (Author's U.S. patent application Ser. No. 929,096 filed Nov. 10, 1986, entitled VARIABLE SPEED POWER-TRANSMITTING SYSTEM, needs not be repeated here. Suffice it to summarize the possibilities and advantages presented by the coupling of an internal combustion engine to an IV drive system:

1. the engine regime, defined by rpm and torque, and the vehicle speed can be simultaneously, constantly and continuously coordinated so as to maintain either a constant speed of the vehicle or an optimum engine torque/rpm relationship which insures minimum specific fuel consumption of the engine at all times, and 2. the engine rpm/torque relationship can be continuously adjusted during vehicle acceleration periods in a manner by which the acceleration is maximized without undue waste of fuel.

The fuel-economy advantage of a positive IV drive system as described herein over that provided by hydraulic and/or friction IV drive systems stems from the elimination of slippage. In the system described in the cited reference, another energy loss results from the unavoidable internal leaks of high-pressure fluid. Both slippage and fluid leakage are non-existent in the system of the present invention. However, they are replaced by complex forms of combinations of solid and rolling frictions that will certainly produce energy losses exceeding those present in comparable capacity gearboxes. The extent of such energy loss excess is not known at this time. However, it is believed that adequate lubrication at the ball/channel and ball/groove contact points will greatly reduce the amount of solid friction (ball/groove) and eliminate risks of ball jamming. Because the ball diameters are slightly smaller than the ball channel diameters, as is well known in the art, a stack of balls transmitting compression arranges itself so that contiguous balls contact opposite "sides" of the restraining/guiding channel walls. In such arrangement, balls roll on balls and on the constraining walls. Minimal solid friction takes place. The same ball arranging process occurs inside the end pockets, although less perfectly and in a much more complex way. However, most of such ideal ball rolling is prevented as soon as a ball becomes engaged between two grooves of a cooperating set. It is impossible to evaluate the ratio between rolling and solid frictions, though an appreciable amount of solid friction is bound to happen then. This is of course similar to what occurs with gears for which designers also attempt to minimize the ratio of tooth sliding to tooth rolling. The amount of solid friction and its effects can be minimized here by accurate groove dimensioning and high degrees of groove wall surface finish, e.g. grinding and possibly lapping as earlier discussed. It is believed that proper machining of the groove wall surfaces will result in acceptable degrees of solid friction and amounts of concomitant energy losses. The percentage of power so lost as compared to the amount of power transmitted should be half-way between those of hydraulic torque converters and those of conventional gearboxes.

The simplest preferred configuration of the present invention IV drive system for use in cars, buses and/or trucks can be defined typically as a system that:

1. includes the RV helical groove features described in FIG. 15 and 18, and the FD/RV selecting pattern shown in FIG. 19, and 2. has no member 160 but a servo-powered positioning system of sleeve 106 (command rod 173), helical grooves 114' and 114" being then located on input shaft portion 103.

In such an examplary configuration, an engine/IV-drive control system consisting of a torque level sensor, a vehicle speed sensor, a FD/RV selector, an electronic processor, a vehicle/engine operation mode selector and a positioning actuator for command rod 173 enables the driver to choose the mode of vehicle operation desired or to control the gas pedal. Details of such operation modes are described and discussed in the cited reference. A driver then has three choices of shifting positions in FIG. 19 diagram, neutral (N), FD or ARV (shown in phantom lines). Sleeve 106 axial position between extreme left and extreme right is set by command rod 173 in response to the control system output signal. Each sleeve 106 position determines the speed ratio deemed optimum by the control system for the operation mode selected by the driver. Further refinement could result from the incorporation of member 160, whereby sleeve 106 axial position is adjusted in response to one engine operation parameter and member 160 axial positon is adjusted in response to another engine operation parameter or a vehicle operation parameter, e.g. velocity. The dual coordinated use of both sleeve 106 and member 160 corresponds to the dual use of the two piston-constraining rings of the invention embodiment of the cited reference. Such dual usage of two complementary components is extensively discussed therein.

Concluding Remarks

In conclusion, the basic embodiment of the present invention and its various construction forms hereinabove described and discussed provide a mechanical IV positive drive system that operates without slippage by simultaneously and continuously engaging a plurality of balls between corresponding and cooperating grooves. Between engagements, the balls roll in guiding and restraining channels while transmitting thrust vectors that serve as intermediary steps in the transmission of power and conversion of torque. Load-transferring sliding motions are limited to those of groove-engaged balls, thereby limiting the amount of power loss caused by solid friction.

Simple versions of this basic embodiment are ideally adaptable to two types of transportation vehicles: (1) bicycles, and (2) automobiles, buses and/or trucks. The IV feature and the manner in which those embodiment versions can be constructed enable such adaptation to both vehicle types to operate in such a way that the torque applied to the input shaft, i.e. exerted by the motor output shaft, may either be controlled or limited by an adjustment made automatically internally by the IV drive system to the speed ratio. In the case of bicycles, it provides an automatic limit to the foot pressure required of the rider. In the case of cars, it provides the means needed for applying speed ratio-adjusting command signals generated by an external control system that regulates the engine/vehicle coupling mode.

In the case of the latter application, the ability provided by the present IV drive system to adjust the speed ratio, hence the torque ratio, between the engine power output shaft and the vehicle power transmission axle enables a driver to optimize the vehicle performance for any driver-selected mode of operation of the vehicle. Such operation mode could be: (1) automatic control of the vehicle velocity, (2) automatic control of the engine operation at its minimum specific fuel consumption regime, and (3) automatic control of the vehicle acceleration according to an optimized program of minimum fuel consumption. The most obvious end results amongst others are:

1. appreciable fuel saving;
2. minimized driving stress level for the driver;
3. easier vehicle handling;
4. reduction of pollution levels;
5. minimized wear of engine and vehicle components; and
6. minimized risks of engine stall.

Other advantages pertaining to vehicle operation will be evident to readers familiar with the art. The major advantage being fuel saving for equal or even superior vehicle performance and longer engine life. The operating cost of the vehicle is also reduced concomitantly. The reduction in pollutant production will be more pronounced during city driving where and when it is most critical and usually predominant. The application to bicycles will render cycling more attractive to those cyclists who enjoy hilly terrains. The levels of stress and strain imposed on foot and leg muscles will also be reduced.

Therefore, it is thought that the positive IV drive system and the operation method thereof of the present invention and many of its attendant advantages will be understood from the foregoing description and it will be apparent that various changes may be made in the form, construction and arrangement of the parts thereof without departing from the spirit and scope of the invention or sacrificing any and all of its material advantages, the form described hereinbefore being merely a preferred or examplary embodiment thereof.

Having thus described by invention, I now claim:

1. A positive infinitely-variable (IV) drive system for mechanically transmitting power and converting torque, and comprising:
   a centrally located first power shaft;
   a hollow second power shaft concentric with and partially positioned around a corresponding portion of said first shaft;
   ball means located between corresponding portions of the second and first shafts for transmitting torque and angular motion between said shafts, the ball of the ball means forming a single continuous chain that is urged to create two sets of a plurality of circumferentially distributed one-ball mechanical links between the two shafts, one set being in contact with the first shaft and the other set being in contact with the second shaft;
   non-rotatable and axially positionable means for guiding and restraining balls between two facing cylindrical surfaces of the two shaft corresponding portions;
   helical groove means located on an outer cylindrical facing surface of the first shaft corresponding portion;
   helical groove means located on an inner cylindrical facing surface of the second shaft corresponding portion;
   two sets of straight groove means located one on each of two concentric cylindrical surfaces of the ball guiding and restraining means, and oriented parallel to an axis common to both concentric cylindrical surfaces so as to intersect both helical groove means, said ball guiding and restraining means being prevented from rotating about the common axis by fixed means, each straight groove being enabled to axially guide and to circumferentially restrain at least one ball and no more than two balls simultaneously at any time; and
   means for urging a plurality of the balls to ride in and to remain constrained between corresponding sets of helical groove means and cooperating associated straight groove means;
   whereby a rotation of either shaft causes each ball to alternatively engage the helical groove means of both shafts along a different straight groove each time that said ball travels from one helical groove means to the other helical groove means and back.

2. The IV drive system according to claim 1 wherein the helix pitch angle of the helical groove means varies along the length of said helical groove means and wherein the shaft outer and inner cylindrical facing surfaces are entirely covered with said helical groove means so as to enable each one ball to always secure lodging accommodation between an helically grooved surface and a corresponding straight groove surface of the ball guiding and restraining means.

3. The positive IV drive system according to claim 2 and further comprising:
   an external structure for supporting and centering the first and second shafts, for supporting the fixed means preventing the rotation of the ball guiding and restraining means, and for mounting means provided for controlling the system operation;

means for adjusting the positions of balls constrained between corresponding sets of helical and straight grooves along a longitudinal direction parallel to the common axis; and means for enabling all thus constrained balls to substantially and continuously remain positioned in a common plane orthogonal to said common axis.

4. The IV drive system according to claim 3 wherein the two concentric cylindrical surfaces of the ball guiding and restraining means are formed by a sleeve structure which houses all balls in a continuous channel forming minor loops between both concentric cylindrical surfaces and between both ends of the sleeve, each minor loop being connected to the contiguous minor loops located on either one of its two sides so as to provide said channel continuity and to form one closed major loop made of a plurality of open and interconnected minor loops, said system further comprising:

means for enabling a plurality of balls to partially emerge externally to the sleeve structure through the straight grooves and to protrude beyond corresponding sleeve concentric cylindrical surfaces;

means for causing the ball emergences to occur substantially simultaneously and continuously on both cylindrical surfaces and in substantially one plane orthogonal to the common axis;

means for enabling each emerging ball to progressively engage a corresponding helical groove; and means for enabling each fully emerged and protruding ball to maintain a positive and singularly positioned engagement between one straight groove and one corresponding helical groove of the groove set for a distance substantially equal to a ball diameter.

5. The positive IV drive system according to claim 4 wherein means is provided:

for insuring that at least one ball in each one of three substantially equally angularly-spaced straight grooves on both concentric cylindrical surfaces is fully positively engaged at all times; and for insuring that the times at which each one of the three fully positively-engaged balls on each one of the two concentric cylindrical surfaces terminates its full engagement are substantially equally distributed over the duration of one ball full engagement.

6. The positive IV drive system according to claim 5 wherein the fixed means used for preventing the sleeve from rotating further includes:

means for enabling the sleeve to slide along a longitudinal direction parallel to the common axis of rotation of both shafts;

means for resisting torques exerted on the sleeve about its axis by the balls; and means for enabling the sleeve to respond freely to longitudinally oriented loads exerted by the balls thereupon and to longitudinal forces applied thereupon for adjusting its longitudinal position.

7. The positive IV drive system according to claim 4 wherein the helix angle of one of the two helical groove means is fixed and the helix angle of the other helical groove means progressively and monotonically varies between both ends of said groove.

8. The positive IV drive system according to claim 4 wherein the helix angles of both helical groove means vary progressively and monotonically between both ends of said grooves and in an inverse manner whereby one helix angle increases whereas the other helix angle decreases.

9. The positive IV drive system according to claim 4 wherein the helical groove means of the first shaft and the helical groove means of the second shaft are oriented in the same direction.

10. The positive IV drive system according to claim 4 wherein the helical groove means of the first shaft and the helical groove means of the second shaft are oriented in opposite directions.

11. The positive IV drive system according to claim 4 wherein the balls are channelled between the ends of the minor loops so as to cause the balls to travel in the straight grooves located on the outer concentric cylindrical surface along a direction opposite to that which the balls in the straight grooves located on the inner concentric cylindrical surface are urged to follow.

12. The positive IV drive system according to claim 4 wherein the balls are channelled between the ends of minor loops so as to cause the balls to travel in the straight grooves located on the outer concentric cyclindrical surface along the same direction as that which the balls in the straight grooves located on the inner concentric cylindrical surface are urged to follow.

13. The positive IV drive system according to claim 4 wherein means is provided for adjusting the combinations of helix angle variations and relative directions so as to determine the ratio between the angular speeds of both shafts and their relative rotation directions, at all times and in a continuous infinitely variable manner.

14. The positive IV drive system according to claim 5 wherein the power first shaft further includes:

an annular member slideable on part of the first shaft, fitted on its outer cylindrical surface with the input shaft helical groove means for engaging the ball means;

straight spline means oriented longitudinally and located between the annular member and the shaft for enabling the member to slide on said shaft; and actuating means for adjusting the longitudinal position of said member relatively to the helically-grooved portion of the second shaft.

15. The positive IV drive system according to claim 4 wherein means is provided in the sleeve for inverting the direction of the ball travels in the minor loop channels between each one of the inner straight grooves and a corresponding downstream outer straight groove, whereby the rotational direction of the second shaft relative to that of the first shaft can be reversed.

16. The positive IV drive system according to claim 14 wherein a portion of the length of the member outer cylindrical surface is covered with helical grooves angularly oriented in one direction whereas another portion of said length is covered with helical grooves angularly oriented in the opposite direction, said member outer cylindrical surface further comprising:

a circular groove extending the full circumferential length of said outer cylindrical surface and separating said two length portions, said groove having a width substantially equal to two ball diameters and a depth equal to that of the helical grooves for enabling the sleeve and the member to disengage whenever the sleeve straight grooves face said circular groove, thus decoupling the first shaft and the second shaft; and means for enabling progressive and gradual engagement and disengagement of either helical groove means by the ball means when the sleeve straight grooves are caused to leave their facing position vis-à-vis the circular groove;

whereby a shift in position of the sleeve straight grooves from one helically-groove portion to the other enables the relative rotational directions of the two shafts to be reversed.

17. The positive IV drive system according to claim 14 wherein the longitudinal position of the sliding shaft member is determined by actuating means controlled by an operator and the longitudinal position of the sleeve adjusts itself automatically so as to control the torque transmitted between the first shaft and the second shaft, said system further comprising:
adjustable spring means for setting the longitudinally oriented force developed by the sleeve; and
means for adjusting said spring load to a level that substantially corresponds to the level at which said torque is to be regulated.

18. The positive IV drive system according to claim 14 wherein the longitudinal position of the sleeve is determined by actuating means controlled by an operator and the longitudinal position of the first shaft sliding member adjusts itself automatically so as to control the torque transmitted between the first shaft and the second shaft, said system further comprising:
adjustable spring means for setting the longitudinally oriented force developed by the shaft sliding member; and
means for adjusting said spring load to a level that substantially corresponds to the level at which said torque is to be regulated.

19. A method of positively transmitting power and converting torque between an first power shaft and a surrounding portion of an second power shaft in an infinitely variable (IV) ratio by means of a continuous ball chain urged by the first shaft to guidingly trvel for mechanical engagement with the second shaft so as to force said second shaft to rotate so as to enable each one ball to continue its travel, whereby the torque and angular displacement needed by the first shaft to urge the balls to move are both transmitted to the second shaft directly and positively, the balls being laterally constrained and guided by looped channels housed in a sleeve positioned between the two shafts and provided with short straight grooves oriented parallel to an axis common to the sleeve and both shafts, said straight grooves being located on two concentric cylindrical sleeve surfaces, one facing a corresponding cylindrical outer surface of an first shaft portion and another facing a corresponding cylindrical inner surface of the second shaft surrounding portion, and being constructed to enable balls to protrude externally to the concentric surfaces when they emerge from the looped channels, both shaft cylindrical surfaces being provided with helically-laid grooves, said straight and helical grooves being arranged and dimensioned so as to enable each one engaged ball to become restrained by a set of one straight groove cooperating with a corresponding helical groove, thereby providing a positive engagement between both shafts by means of a plurality of compliant and fixed-length ball chain segments, said method comprising the steps of:
adjusting the position of the straight grooves along a longitudinal direction parallel to the common axis, thus causing balls to engage the helical grooves substantially in one plane orthogonal to said common axis, and enabling said plane position to vary between one end of the helical grooves and another end; and
restraining the straight grooves for sliding motion solely in the longitudinal direction by means of guiding and laterally constraining the sleeve that is otherwise enabled to longitudinally and freely slide between the two shafts.

20. The method recited in claim 19 wherein the pitch angle of the groove helices vary from one end of a groove to another along the common axis direction, increasing for the first shaft helical grooves whilst decreasing for the second shaft helical grooves as the ball-engagement plane is caused to shift from one end of the grooved portion of either shaft to the other end of said portion, whereby the torque and angular velocity ratios between the two shafts are solely and substantially determined by the pitch angles of the helical grooves of both shafts for a given diameter ratio of their two facing cylindrical surfaces, and whereby the relative direction of the helix pitch of the grooves on said surfaces determines the relative rotation direction of the two shafts, and wherein means is provided for inverting the direction of the ball travel in the straight grooves located on the sleeve outer concentric cylindrical surface, said method comprising the further steps of:
setting the longitudinal position of the ball engagement plane to determine the torque and angular speed ratios at which the two shafts operate;
reversing the second shaft rotation direction for a fixed rotation direction of the first shaft by causing the pitch angle direction of the input shaft helical grooves to become inverted, while causing the ball travel directions in the straight grooves to remain unchanged; and
reversing the second shaft rotation direction for a fixed rotation direction of the first shaft by causing the ball travel direction in the outer straight grooves to become inverted.

21. The method recited in claim 20 wherein an intermediary annular structural member slideable on the first shaft by means of straight splines and equipped with the first shaft helical grooves is provided for engaging the ball segments protruding externally to the inner concentric cylindrical surface, and both the sleeve and the member are free to assume an imposed longitudinal position relative to both shafts and to each other, said method comprising the further steps of:
selectively positioning the sleeve longitudinally so as to cause the ball-engagement plane to assume a set position relatively to the second shaft helical grooves, whereas the member longitudinal position is automatically imposed by the balancing actions of an adjustable spring force defined by actuation means under the control of an operator and the longitudinal component of the transmitted torque load generated by the straight-groove/ball/helical-groove interaction between the member and the sleeve, as the first shaft rotates; and
selectively positioning the member longitudinally so as to cause said member to assume a set position relatively to the second shaft helical grooves, whereas the sleeve longitudinal position is automatically imposed by the balancing actions of an adjustable spring force defined by actuation means under the control of an operator and the longitudinal component of the transmitted torque load generated by the straight-groove/ball/helical-groove combined interactions between the sleeve and both shaft helical grooves, as the first shaft rotates.

22. The IV drive system according to claim 6 wherein means is provided for continuously maintaining the annular structure of the sleeve substantially centered between the facing helically-grooved surfaces between which said sleeve slides as both shafts rotate, in a manner such that the ball-engagement plane is urged to remain orthogonal to both shafts common axis of rotation.

23. The IV drive system according to claim 4 wherein means is provided for preventing jamming of the balls in the channelling transition spaces connecting the ball channels located in the sleeve to the straight grooves.

24. The IV drive system according to claim 5 wherein means is provided by the helical grooves for enabling their machining and their wall surface grinding and finishing so as to minimize the amount of solid friction between engaged balls and groove surfaces, when balls are constrained between two cooperating grooves.

25. The IV drive system according to claim 15 wherein means is provided for assisting the detouring of the paths of balls between two sequentially adjacent straight grooves simultaneously with the actuation of the means for inverting the direction in which the balls travel in a first one of said two grooves whereas the direction of the ball travel remains unchanged in a second one of said two grooves.

* * * * *